United States Patent
Thorpe

(10) Patent No.: US 9,245,139 B2
(45) Date of Patent: *Jan. 26, 2016

(54) NON-RETAINED MESSAGE SYSTEM

(71) Applicant: John R. Thorpe, Columbia, MO (US)

(72) Inventor: John R. Thorpe, Columbia, MO (US)

(73) Assignee: John R. Thorpe, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,833

(22) Filed: Sep. 15, 2014

(65) Prior Publication Data

US 2015/0007342 A1 Jan. 1, 2015

Related U.S. Application Data

(63) Continuation-in-part of application No. 13/844,136, filed on Mar. 15, 2013, now Pat. No. 8,837,717.

(51) Int. Cl.
*G06F 21/62* (2013.01)
*G06F 21/10* (2013.01)
*H04L 12/58* (2006.01)
*G06F 21/70* (2013.01)
*G06F 21/64* (2013.01)
*G06F 21/60* (2013.01)
*H04L 9/08* (2006.01)
*H04L 9/32* (2006.01)

(52) U.S. Cl.
CPC ............... *G06F 21/62* (2013.01); *G06F 21/10* (2013.01); *G06F 21/606* (2013.01); *G06F 21/64* (2013.01); *G06F 21/70* (2013.01); *H04L 9/0861* (2013.01); *H04L 9/3271* (2013.01); *H04L 51/12* (2013.01)

(58) Field of Classification Search
CPC ........ G06F 21/64; G06F 21/606; G06F 21/70
See application file for complete search history.

(56) References Cited

U.S. PATENT DOCUMENTS

| 8,191,147 B1 * | 5/2012 | Gardner ................ G06F 21/552 726/24 |
| 2003/0147536 A1 | 8/2003 | Andivahis et al. |
| 2004/0059790 A1 * | 3/2004 | Austin-Lane ........... H04L 51/04 709/207 |

(Continued)

OTHER PUBLICATIONS

FR Yu, H Tang, Distribute node selection for threshold key management with intrusion detection in mobile ad hoc networks, Wireless Networks, 2010, SpringeSystems and Computer Engineering, Carleton University, Ottawa, pp. 1-10.

(Continued)

*Primary Examiner* — Harunur Rashid
*Assistant Examiner* — Ali Shayanfar
(74) *Attorney, Agent, or Firm* — Patent Law Works LLP

(57) ABSTRACT

A system and method for non-retained electronic messaging is described. In one embodiment, the system includes a message receiver module, a message storing and identifier generation module, a message retrieval module and an expunging module. The message receiver module receives a message. The message storing and identifier generation module stores the message in a non-transitory, non-persistent memory of one or more computing devices, generates a message identifier and sends the message identifier to a recipient device. The message retrieval module receives a selection of the message identifier from the recipient device, retrieves the message from the non-transitory, non-persistent memory, and sends the message to the recipient device for presentation. The expunging module expunges the message from the one or more devices responsive to sending the message to the recipient device for presentation.

18 Claims, 10 Drawing Sheets

(56) References Cited

U.S. PATENT DOCUMENTS

| | | | |
|---|---|---|---|
| 2006/0253714 A1* | 11/2006 | Ito | G06F 21/554 713/194 |
| 2007/0205798 A1* | 9/2007 | Disser | G01R 31/343 324/765.01 |
| 2008/0134309 A1* | 6/2008 | Qin | G06F 21/105 726/6 |
| 2010/0250691 A1 | 9/2010 | Tomkow | |
| 2011/0113260 A1* | 5/2011 | Ma | G09C 1/00 713/193 |
| 2012/0303612 A1 | 11/2012 | Piotr Konrad | |

OTHER PUBLICATIONS

International Preliminary Report on Patentability for PCT/US2014/025078, mailed on Sep. 24, 2015, 10 pages.

* cited by examiner

NON-RETAINED MESSAGE SYSTEM

CROSS-REFERENCE TO RELATED APPLICATIONS

This application is a continuation in part of and claims priority to U.S. application Ser. No. 13/844,136, filed Mar. 15, 2013, titled "Non-Retained Message System," which is incorporated by reference in its entirety.

BACKGROUND

The specification relates to electronic messaging. In particular, the specification relates to non-retained electronic messaging. Existing e-mail systems, involve sending messages through a complex network of servers such as SMTP, IMAP and POP servers. When messages are sent through these servers, copies of the messages are often stored and retained for the purposes of delivery. Even after the messages have been delivered, it is highly likely that numerous copies of the message are retained in the network, either as backups, cloud-based copies of emails, archives, inboxes, junk mail, trash items, etc. In many circumstances, especially where highly sensitive or confidential messages or documents are being transmitted, the goal is only to communicate to the receiving party and not have any of the information retained anywhere else throughout the system. Having messages or documents retained, many times permanently, means that the communicating parties have lost control of those messages and documents. Such a loss of control can lead to detrimental outcomes, including accidental disclosure of information, unwanted indications of communications and numerous other undesirable consequences.

Similarly, social networking sites such as Facebook, Twitter, Google+, etc. retain content such as photographs, videos, text and other user content permanently or for a period outside the originator's control. There may be instances when an originator of content would like to post content for the purpose of sharing, but does not desire for the content to be retained indefinitely or outside the originator's control.

SUMMARY

The specification overcomes deficiencies and limitations of the prior art at least in part by providing a system and method for non-retained electronic messaging.

The specification describes a system, method and computer program product for non-retained electronic messaging according to some embodiments. In one embodiment, the system comprises a message receiver module, a message storing and identifier module, a message retrieval module and an expunging module. The message receiver module receives a message. The message storing and identifier generation module stores the message in a non-transitory, non-persistent memory of one or more computing devices, generates a message identifier and sends the message identifier to a recipient device. The message retrieval module receives a selection of the message identifier from the recipient device, retrieves the message from the non-transitory, non-persistent memory and sends the message to the recipient device for presentation. The expunging module expunges the message from the one or more devices responsive to the message retrieval module sending the message to the recipient device for presentation.

In some embodiments, the expunging module expunges the message identifier from the one or more computing devices responsive to sending the message identifier to the recipient device. In some embodiments, the message identifier and message are sent anonymously based on a user preference associated with a sender of the message. In some embodiments, the message identifier is a URL. In some embodiments, the system lacks a writable, persistent memory. In some embodiments, the message identifier and message are sent to an e-mail client through a standard e-mail protocol.

In some embodiments, the system includes a key generation module for generating a globally unique key. In some embodiments, the message identifier is based at least in part on the globally unique key. In some embodiments, the expunging module expunges the globally unique key from the one or more computing devices responsive to sending the message identifier to the recipient device, and receiving the selection of the message identifier includes receiving the globally unique key.

In some embodiments, the system includes an index hashing module for generating a hashed index based at least in part on the globally unique key, and the message is stored in the non-transitory, non-persistent memory using the hashed index. In some embodiments, the index is hashed based at least in part on a device key, the device key associated with a computing device comprising the non-transitory, non-persistent memory on which the message is stored. In some embodiments, the expunging module expunges the hashed index from the one or more computing devices responsive to sending the message identifier to the recipient device.

In some embodiments, the system includes an index generation module for generating a globally unique index responsive to receiving the message. In some embodiments, the hashed index generated by the index hashing module is based at least in part on the globally unique index, the expunging module expunges the globally unique index from the one or more computing devices responsive to sending the message identifier to the recipient device, the message identifier is based at least in part on the globally unique index and receiving the selection of the message identifier includes receiving the globally unique index.

In some embodiments, the system includes a message encryption module for encrypting the message prior to storing the message in the non-transitory, non-persistent memory. In some embodiments, a key generation module generates a globally unique key, the message encryption module encrypts the message using an encryption key prior to storing the message in the non-transitory, non-persistent memory, wherein the encryption key is based at least in part on the globally unique key, and decrypts the message retrieved from the non-transitory, non-persistent memory prior to sending the message to the recipient device for presentation, and the expunging module expunges the globally unique key and the encryption key from the one or more computing devices responsive to sending the message identifier to the recipient device, the message identifier based at least in part on the globally unique key, and wherein receiving the selection of the message identifier includes receiving the globally unique key.

In some embodiments, the expunging module sets a timer based on a user defined time period and expunges the message from the non-transitory, non-persistent memory of the one or more computing devices responsive to a failure to receive the selection of the message identifier from the recipient device within the user defined time period. In some embodiments, the expunging module sets a timer based on a system defined time period for the system and expunges the message from the non-transitory, non-persistent memory of the one or more computing devices responsive to a failure to receive the selection of the message identifier from the recipient device within the system defined time period.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
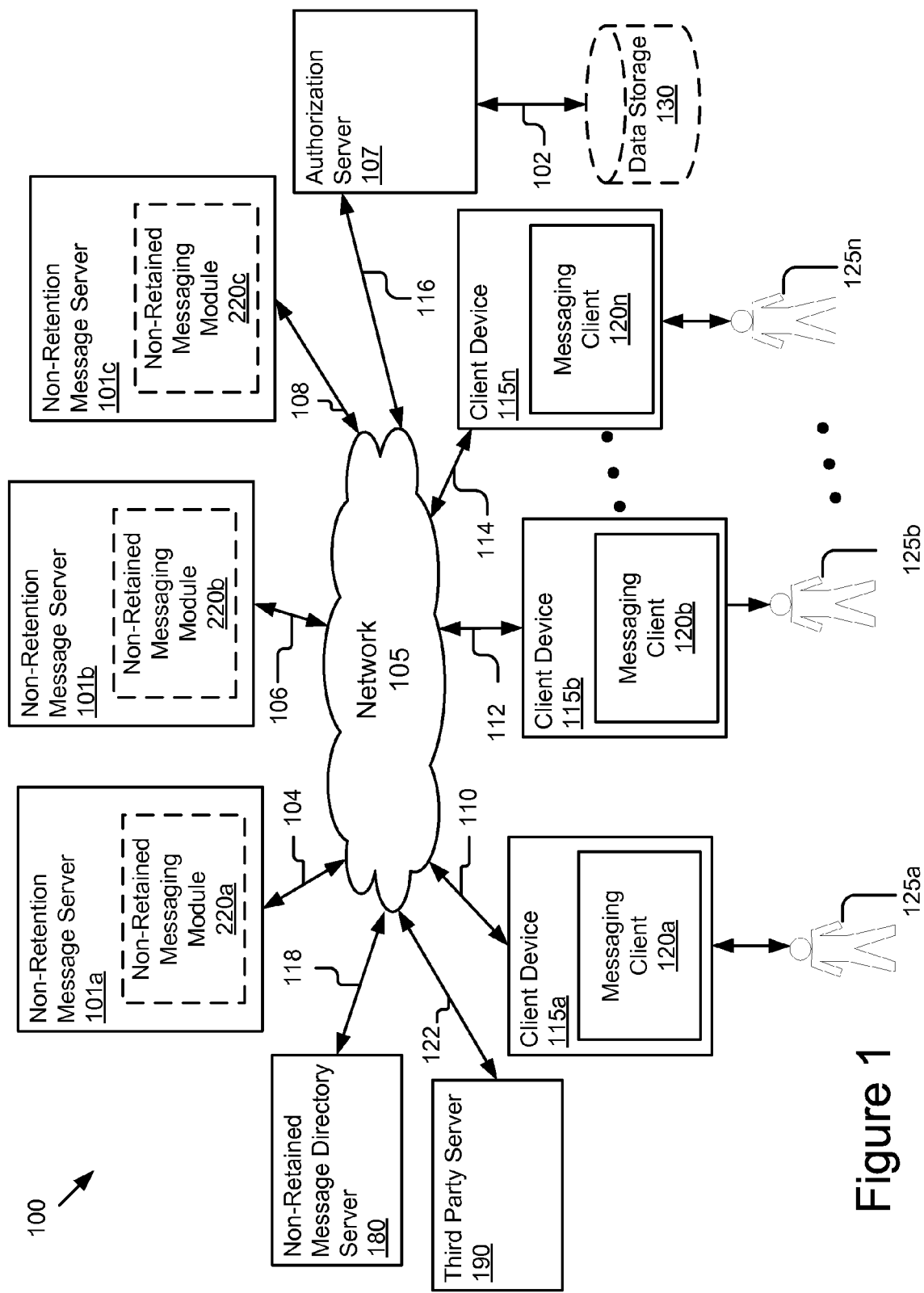
FIG. 1 illustrates a system for non-retained electronic messaging according to one embodiment.

A system and method for non-retained electronic messaging. In the following description, for purposes of explanation, numerous specific details are set forth in order to provide a thorough understanding of the embodiments. It will be apparent, however, that the embodiments can be practiced without these specific details. In other instances, structures and devices are shown in block diagram form in order to avoid obscuring the embodiments. For example, one embodiment is described below with reference to user interfaces and particular hardware. However, the present embodiments may apply to different types of computing device that can receive data and commands, and peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

System Overview

FIG. 1 illustrates a block diagram of a system 100 for non-retained electronic messaging. The illustrated system 100 includes client devices 115a, 115b, and 115n (also referred to collectively as client devices 115 or individually as client device 115) that are accessed by users 125a, 125b, and 125n (also referred to collectively as users 125 or individually as user 125), non-retained message (NRM) servers 101a, 101b, and 101c (also referred to collectively as NRM servers 101 or individually as NRM server 101), a non-retained message directory server 180, a third party server 190, and an authorization server 107. In the illustrated embodiment, these entities are communicatively coupled via a network 105. Although three client devices 115 are illustrated, any number of client devices 115 are available to any number of users 125.

The client devices 115 in FIG. 1 are used by way of example. While FIG. 1 illustrates three client devices 115, the present specification applies to any system architecture having one or more client devices 115. Furthermore, while only one network 105 is coupled to the client devices 115, the NRM servers 101 and the authorization server 107, in practice any number of networks 105 can be connected to the entities. Furthermore, while only one non-retained message directory server 180 is shown, the system 100 can include any number of non-retained message directory servers 180. Furthermore, while only one third party server 190 is shown, the system 100 can include any number of third party servers 190.

Furthermore, while only one authorization server 107 is shown, the system 100 can include any number of authorization servers 107. In one embodiment, the system 100 includes multiple authorization servers 107 addressed by a single URL, address or domain name. In one embodiment, the system 100 includes multiple authorization servers 107 fronted by a load balancer (not shown).

Furthermore, while FIG. 1 illustrates three NRM servers 101, the present specification applies to any system architecture having one or more NRM servers 101. In one embodiment, the system 100 includes NRM servers 101 addressed by a single URL, address or domain name. In one embodiment, the system 100 includes multiple NRM servers 101 fronted by a load balancer.

In one embodiment, a non-retained messaging module 220a is included in the NRM server 101a and is operable on the NRM server 101a, which is connected to the network 105 via signal line 104. In another embodiment, the non-retained messaging module 220b is included in the NRM server 101b and is operable on the NRM server 101b, which is connected to the network 105 via signal line 106. In yet another embodiment, the non-retained messaging module 220c is included in the NRM server 101c and is operable on the NRM server 101c, which is connected to the network 105 via signal line 108. It will be recognized that the non-retained messaging module 220a/220b/220c (referred to generally as the non-retained messaging module 220) can be stored in any combination of one or more NRM servers 101. In some embodiments the non-retained messaging module 220 includes multiple, distributed modules that cooperate with each other to perform the functions described below. Details describing the functionality and components of the non-retained messaging module 220 are explained in further detail below with regard to FIG. 3.

The network 105 enables communications between client devices 115, the NRM servers 101 and the authorization server 107. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In one embodiment, the network 105 is an IP-based wide or metropolitan area network.

In the illustrated embodiment, the client devices 115a, 115b and 115n are coupled to the network 105 via signal lines 108, 112 and 114, respectively. The user 125a can interact with the client device 115a. Similarly, the user 125b can interact with the client device 115b, and the user 125n can interact with the client device 115n. The NRM server 101a is communicatively coupled to the network 105 via signal line 104. The NRM server 101b is communicatively coupled to the network 105 via signal line 106. The NRM server 101c is communicatively coupled to the network 105 via signal line 108. The authorization server 107 is communicatively coupled to the network 105 via signal line 116. In one embodiment, the authorization server 107 is communicatively coupled to data storage 130 via signal line 102. In one embodiment, the non-retained message directory server 180 is communicatively coupled to the network 105 via signal line 118. In one embodiment, the third party servers 190 is communicatively coupled to the network via signal line 122.

In one embodiment, the data storage 130 stores data and information of each user 125 of the system 100. In one embodiment, the stored data and information includes credentials associated with each user 125. Credentials may be based at least in part on one or more of what a user 125 knows (e.g., a password), what a user 125 is and what a user 125 possesses. Examples of credentials include but are not limited to a user name and/or password, a user alias, e-mail address, a biometric identifier, an electronic identifier or anything else capable of identifying a user 125 and/or an associated user account. In one embodiment, which is discussed below, a storage device 214 (see FIG. 2) is included in the authorization server 107 (i.e. one embodiment of a computing device 200) and the storage device 214 stores the data and information of users 125 of the authorization server 107.

In one embodiment, a client device 115a/115b/115n is an electronic device having a messaging client 120a/120b/120n (also referred to collectively as messaging clients 120 or individually as messaging client) for interacting with the various servers 101, 107 and client devices 115 of the system 100 via the network 105. The client device 115 can be, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. It will be recognized that other types of client devices 115 are possible. In one embodiment, the system 100 comprises a combination of different types of client devices 115. For example, a combination of a personal computer, a mobile phone and a tablet computer. In one embodiment, the system comprises a combination of different messaging clients 120. For example, messaging client 120a is Messaging Client A offered by Company A, messaging client 120b is Messaging Client B offered by Company B and messaging client 120c is Messaging Client C offered by Company C. In one embodiment, the client device includes a web browser (not shown). The user 125 is a human user of the client device 115.

In one embodiment, the non-retained message directory server 180 locates a NRM server 101 for storage and retrieval of a message by an NRM server 101. In one embodiment, the non-retained message directory server 180 communicates with the NRM servers 101 to determine which NRM servers will store redundant copies of a message for back-up. In one embodiment, the non-retained message directory server 180 is not a separate server, but incorporated into an NRM server 101. For example, the message back-up module 322, discussed below in reference to FIG. 3, determines which NRM servers 101 will store redundant copies of a message for back-up.

In one embodiment, the third party servers 190 is a server associated with a traditional messaging system (e.g. e-mail, instant message, social networks, micro-blogs, short message services (SMS), etc.) and provides traditional messaging services (e.g. e-mailing, instant messaging, social networking, micro-blogging, SMS messaging, etc.). In one embodiment, the third party server 190 is used by the non-retained messaging system 100 to send a message identifier (not the message itself) to a recipient. For example, a message identifier may be sent as a "tweet" on Twitter, as a post on Facebook, as a message on LinkedIn, as an e-mail via Gmail, as an SMS text message, etc. It should be recognized that the preceding are merely examples of traditional messaging services and others exist. The message identifier is discussed below in reference to FIG. 3. In one embodiment, messages storage and sending is exclusive to NRM servers 101 and a third party server 190 or other server (e.g. authorization server 107) is not used to send or store a message.

Example Computing Device 200

Figure 2A:
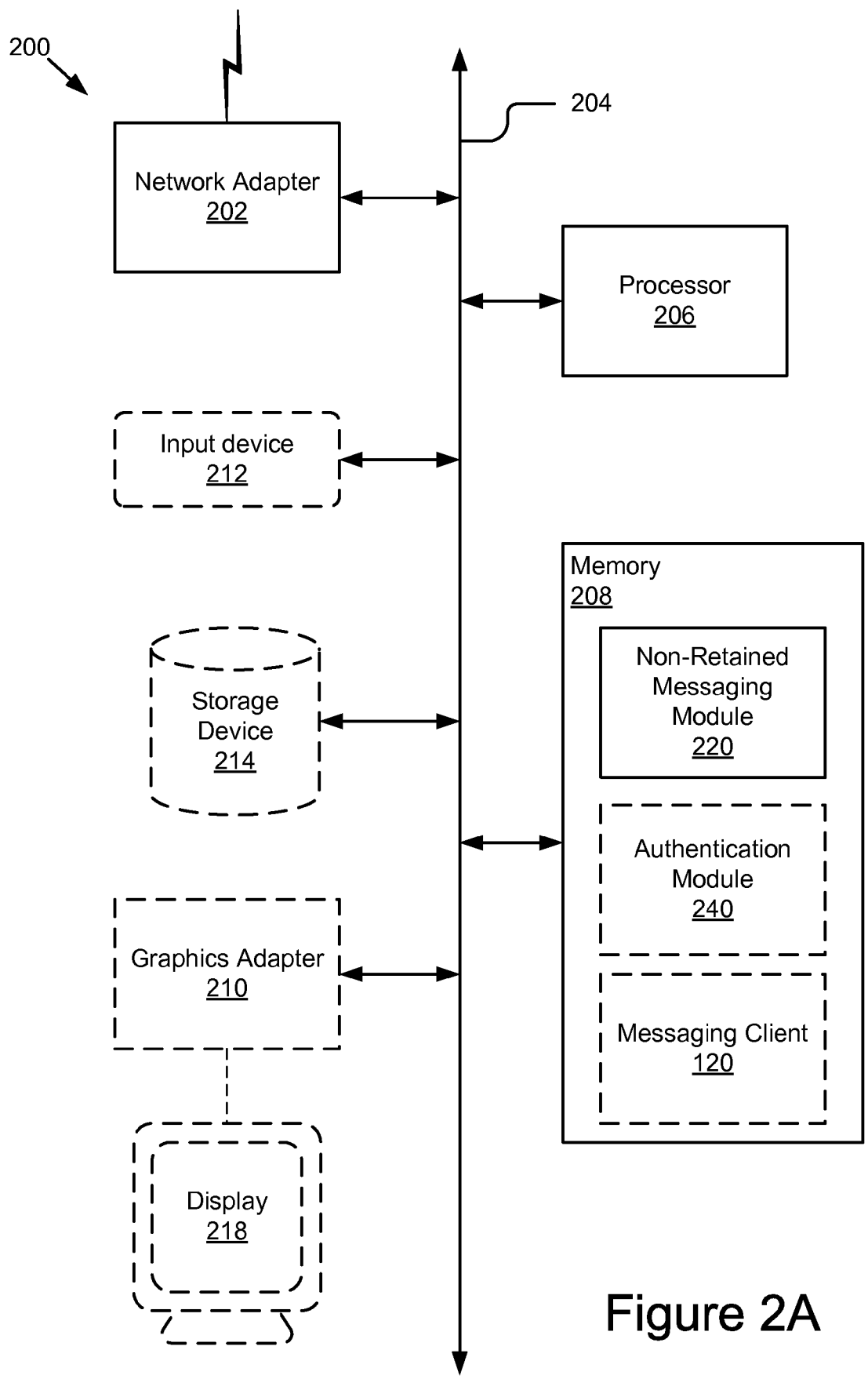
FIG. 2A is a block diagram illustrating a computing device for non-retained messaging according to one embodiment.

FIG. 2A is a block diagram of a computing device 200 for non-retaining messaging according to one embodiment. As illustrated in FIG. 2A, the computing device 200 includes a network adapter 202 coupled to a bus 204. According to one embodiment, also coupled to the bus 204 are at least one processor 206, memory 208, a graphics adapter 210, an input device 212, a storage device 214. The memory 208 stores one or more modules, which are executed by the processor 206. In one embodiment, the functionality of the bus 204 is provided by an interconnecting chipset. The computing device 200 also includes a display 218, which is coupled to the graphics adapter 210.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be recognized that other processors, operating systems, sensors, displays and physical configurations are possible.

The memory 208 is a non-transitory storage medium. The memory 208 holds instructions and/or data that may be executed by the processor 206. In one embodiment, the instructions and/or data stored on the memory 208 comprise code for performing any and/or all of the techniques described herein. The memory 208 may be a dynamic random access memory (DRAM) device, a static random access memory (SRAM) device, flash memory or some other memory device. In one embodiment, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known for storing information on a more permanent basis. In some embodiments, the memory 208 includes only volatile memory. The memory 208 is coupled by the bus 204 for communication with the other components of the computing device 200. In one embodiment, the computing device 200 is a NRM server 101 and a non-retained messaging module 220 is stored in memory 208 and executable by the processor 206. In one embodiment, the computing device 200 is an authorization module 107 and an authentication module 240 is stored in the memory 208 and executable by the processor 206. In one embodiment, the computing device 200 is a client device 115 and a messaging client 120 is stored in the memory 208 and executable by the processor 206.

In one embodiment, the computing device 200 is a NRM server 101 and includes a non-retained messaging module 220. The non-retained messaging module 220, which is occasionally referred to herein as a "NRM module 220," includes code and routines executable by the processor 206 for non-retained electronic messaging. In one embodiment, the non-retained messaging module 220 is a set of instructions executable by the processor 206. In another embodiment, the non-retained messaging module 220 is stored in the memory 208 and is accessible and executable by the processor 206. Details describing the functionality and components of the non-retained messaging module 220 are explained in further detail below in reference to FIG. 3.

In one embodiment, the computing device 200 is an authorization server 107 and includes an authentication module 240. The authentication module 240 includes code and routines executable by the processor 206 for authenticating credentials and authorizing use of the non-retained messaging system 100. In one embodiment, the authentication module 240 is a set of instructions executable by the processor 206. In another embodiment, the authentication module 240 is stored in the memory 208 and is accessible and executable by the processor 206.

The authentication module 240 authenticates credentials and authorizes use of the non-retained messaging system 100. In one embodiment, the authentication module 240 compares user credentials provided by a user to those stored by the authorization server 107 (e.g. in a data store 130 or storage device 214 of the authorization server 107), and authenticates the user if there is a match. In one embodiment, user credentials include a username and password and the username and hashed password of each user is stored (e.g. as a flat file or relational database) in the data store 130 or storage device 214 of the authorization server 107. In one embodiment, the passwords are hashed to prevent illegitimate acquisition and exploitation of the passwords by a hacker or other nefarious user. In one embodiment, multiple authorization servers 107 are included in the non-retained messaging system 100 and the multiple authorization servers 107 share a common database of user credentials. It will be recognized that other embodiments may include credentials other than, or different from, username and password.

In one embodiment, the computing device 200 is a client device 115 and includes a messaging client 120. The messaging client 120 includes code and routines executable by the processor 206 for sending and receiving messages over the non-retained electronic messaging system 100. In one embodiment, the messaging client 120 is a set of instructions executable by the processor 206. In another embodiment, the messaging client 120 is stored in the memory 208 and is accessible and executable by the processor 206.

A messaging client 120 may include one or more of an e-mail client, instant messaging client, or any other messaging client. For the purposes of clarity and simplification, many of the examples contained herein assume the messaging client 120 is an e-mail client. However, it will be recognized that the description may be applied to other types of messaging clients 120 as well.

In one embodiment, the user configures the messaging client 120 in much the same way as the user would for a typical messaging service. For example, in one embodiment, the sender adds an e-mail server account to the e-mail client in the same manner as any other e-mail account except the outgoing mail server for the account is the address, or domain name, of the NRM servers 101.

In one embodiment, the messaging client 120 allows the user to compose a message (e.g., including one or more of a subject, text, audio, video, images, files, attachments, etc.), identify a recipient and send the message. In one embodiment, the user interfaces for composing a message to be sent using the non-retained messaging system 100 may be identical, or nearly identical, to those for sending a traditional message using the messaging client 120. In one embodiment, the messaging client 120 formats the message the same as a message to be sent on a traditional messaging system (e.g. e-mail, instant message, etc.). For example, assume the messaging client 120 is an e-mail client; in one embodiment, the e-mail client formats the message using a standard e-mail protocol (e.g. SMTP) for sending via the non-retained messaging system 100. It will be recognized that the preceding is merely an example of a format and that others exist.

In one embodiment, the messaging client 120 receives and stores user preferences locally on the client device 115. Examples of user preferences include, but are not limited to, one or more of whether the sender of a message is identified to the recipient, a user defined time period defining a message's lifespan on NRM server(s) 101 and event from which the lifespan is measured. Some of these examples are discussed further below. It will be recognized that the preceding are merely examples and other examples of user preferences exist. In one embodiment, the messaging client 120 allows a recipient user to locally save or print a message sent via the non-retained message system 100. In one embodiment, assuming a user decides not to locally save or print a message delivered via the system 100, that message is permanently lost and unrecoverable, because messages are automatically expunged from the system 100 after retrieval/delivery.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device. In one embodiment, the storage device 214 stores data and information of a user 125. For example, in one embodiment, the computing device 200 is an authorization server 107 and the storage device 214 stores the user data and information discussed above in reference to data storage 130 (e.g. credentials). In another example, in one embodiment, the computing device 200 is a client device 115 and the storage device 214 stores messages.

The input device 212 may include a mouse, track ball, or other type of pointing device to input data into the computing device 200. The input device 212 may also include a keyboard, for example, a QWERTY keyboard, a graphical code scanner or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

As is known in the art, a computing device 200 can have different and/or other components than those shown in FIG. 2A. For example, the computing device 200 can have speakers or another form of audio output. In addition, the computing device 200 can lack certain illustrated components. For example, in one embodiment, the computing device 200 is an authorization server 107 and lacks an input device 212, graphics adapter 210 and/or display 218. Moreover, the storage device 214 can be local and/or remote from the computing device 200 (e.g., a storage area network (SAN)).

Figure 2B:
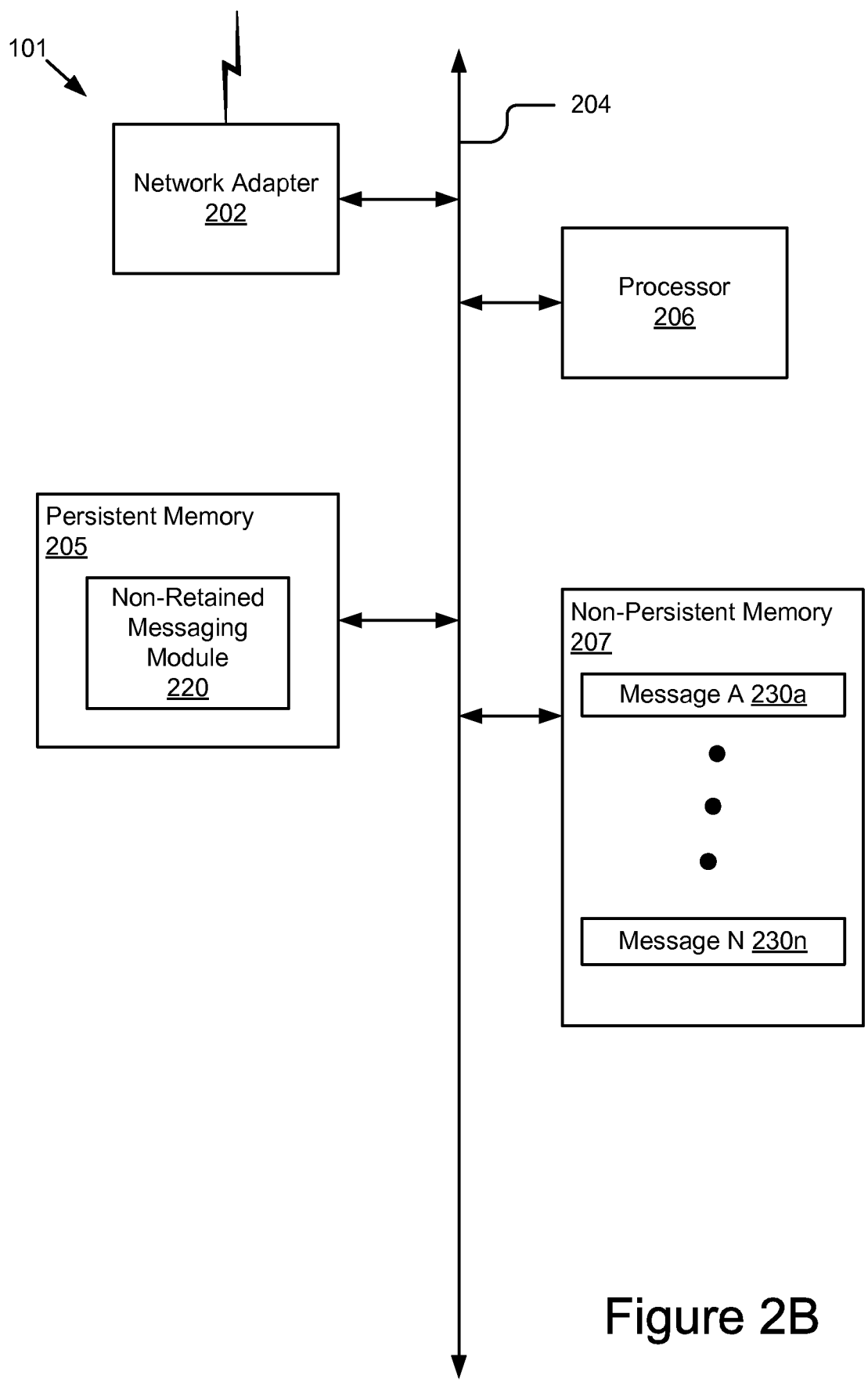
FIG. 2B is a block diagram illustrating a non-retention message server according to one embodiment.

Now referring to FIG. 2B, which illustrates a block diagram of a NRM server 101 according to one embodiment. In one example, the computing device 200 is an NRM server 101 and according to the illustrated one embodiment lacks an input device 212, storage device 214, graphics adapter 210 and a display 218. Furthermore, according to one embodiment, a NRM server 101 includes a non-persistent memory 207 and a persistent memory 205. The memories 205, 207 are coupled by the bus 204 for communication with the other components of the NRM server 101.

In one embodiment, the non-persistent memory 207 stores a message 230a, 230n sent using the non-retained messaging system 100 pending delivery to the recipient. In one embodiment, the non-persistent memory 207 is volatile memory. Examples of volatile memory include, but are not limited to, dynamic random access memory (DRAM) device, a static random access memory (SRAM) device, a processor cache, etc.

In one embodiment, the NRM server 101 includes persistent memory 205 for storing the non-retained messaging module 220. Examples of persistent memory include non-volatile memory or similar permanent storage devices and media, for example, a hard disk drive, a floppy disk drive, a CD-ROM device, a DVD-ROM device, a DVD-RAM device, a DVD-RW device, a flash memory device, or some other mass storage device for storing information on a more permanent basis. In an exemplary embodiment, the persistent memory 205 is a read only memory (ROM) and incapable of storing messages sent using the non-retained messaging system 100. In one embodiment, the computing device 200 is a NRM server 101 and a non-retained messaging module 220 is stored in the persistent memory 205 and executable by the processor 206. Since non-persistent memory 207 (e.g. RAM) is not permanent and is generally more expensive and provides less capacity than persistent memory 205 (e.g. a hard disk drive), embodiments in which the NRM server 101 lacks a writable, persistent memory or persistent memory entirely may decrease the chances and dis-incentivize retaining messages indefinitely on the non-retained messaging system 100.

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Example Non-Retained Messaging Module 220

Figure 3:
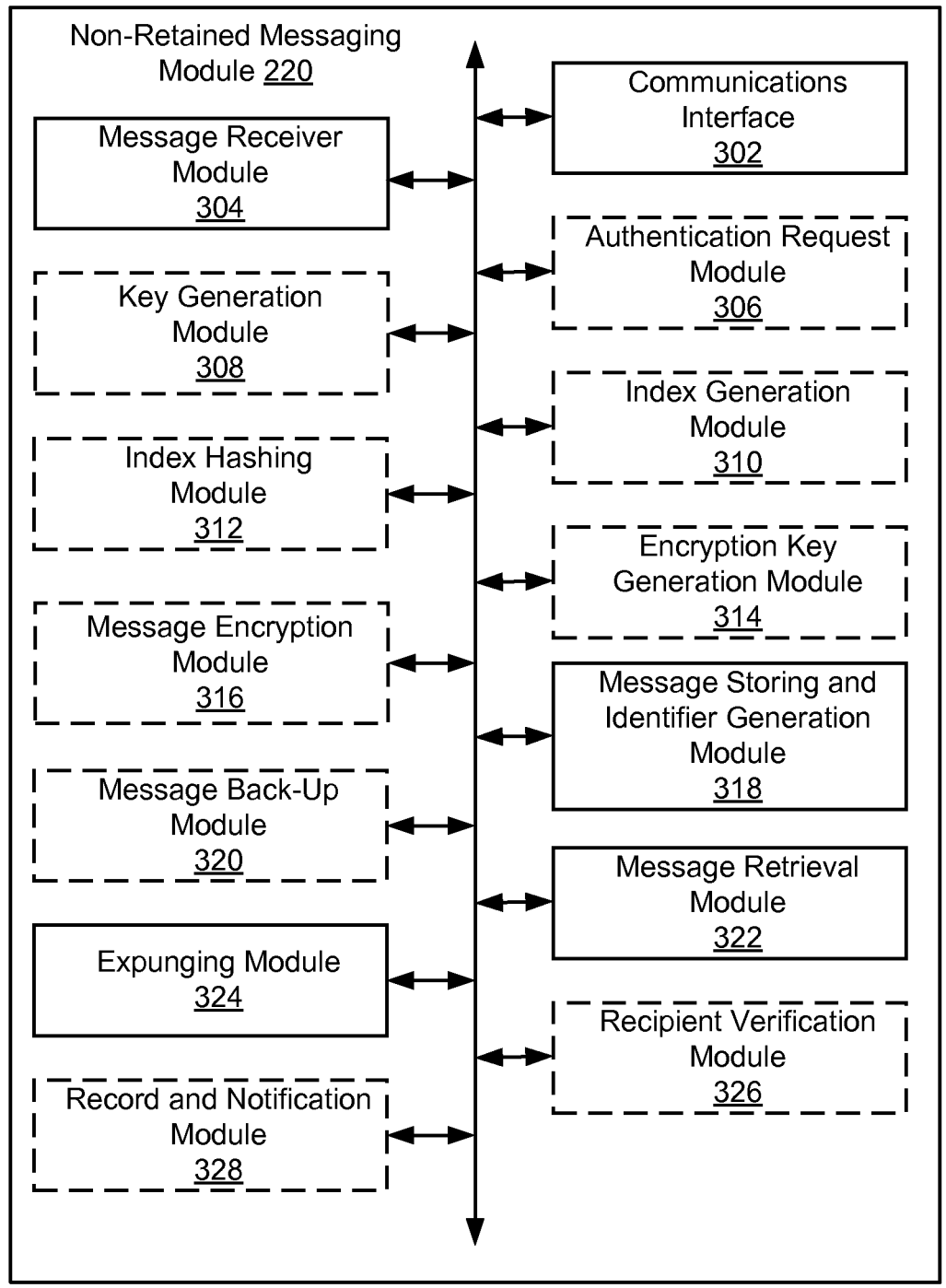
FIG. 3 is a block diagram illustrating a non-retained messaging module according to one embodiment.

Referring now to FIG. 3, the non-retained messaging module 220 is shown in more detail according to one embodiment. FIG. 3 is a block diagram of the non-retained messaging module 220 included in a NRM server 101.

In one embodiment, the non-retained messaging module 220 comprises a communications interface 302, a message receiver module 304, a message storing and identifier generation module 318, a message retrieval module 322 and an expunging module 324. In some embodiments, the non-retained messaging module 220 optionally also includes one or more of an authentication request module 306, a key generation module 308, an index generation module 310, an index hashing module 312, an encryption key generation module 314, a message encryption module 316, a message back-up module 320 a recipient verification module 326 and record and notification module 328.

It will be recognized that the modules 302, 304, 306, 308, 310, 312, 314, 316, 318, 320, 322, 324, 326, 328 comprised in the non-retained messaging module 220 are not necessarily all on the same NRM server 101. In one embodiment, the modules 302, 304, 306, 308, 310, 312, 314, 316, 318, 320, 322, 324, 326, 328 are distributed across multiple NRM servers 101. For example, in one embodiment, the message back-up module 316 is included in NRM server 101a and the other modules 302, 304, 306, 308, 310, 312, 314, 318, 320, 322, 324, 326 and 328 are included in NRM server 101b. It will be recognized that the preceding is merely an example of distributing modules across multiple NRM servers 101 and that other examples exist.

The communication interface 302 includes code and routines for handling communications between the message receiver module 304, the authentication request module 306 (depending on the embodiment), the key generation module 308 (depending on the embodiment), the index generation module 310 (depending on the embodiment), the index hashing module 312 (depending on the embodiment), the encryption key generation module 314 (depending on the embodiment), the message encryption module 316 (depending on the embodiment), the message storing and identifier generation module 318, the message back-up module 320 (depending on the embodiment), the message retrieval module 322, the expunging module 324, the recipient verification module 326 (depending on the embodiment), the record and notification module 328 (depending on the embodiment) and other components of the NRM server 101. In one embodiment, the communication interface 302 is a set of instructions executable by the processor 206. In another embodiment, the communication interface 302 is stored in the persistent memory 205 and is accessible and executable by the processor 206. In either embodiment, the communication interface 302 is adapted for cooperation and communication with the processor 206, other components of the NRM server 101 and other components of the non-retained messaging module 220.

The communication interface 302 handles communications between the message receiver module 304, the authentication request module 306 (depending on the embodiment), the key generation module 308 (depending on the embodiment), the index generation module 310 (depending on the embodiment), the index hashing module 312 (depending on the embodiment), the encryption key generation module 314 (depending on the embodiment), the message encryption module 316 (depending on the embodiment), the message storing and identifier generation module 318, the message back-up module 320 (depending on the embodiment), the message retrieval module 322, the expunging module 324, the recipient verification module 326 (depending on the embodiment), the record and notification module 328 (depending on the embodiment) and other components of the NRM server 101. For example, in one embodiment, the communication interface 202 communicates with the key generation module 308 and the index hashing module 312 to pass the output of the key generation module 308 (i.e. a globally unique key) to the index hashing module 312. However, this description may occasionally omit mention of the communication interface 302 for purposes of clarity and convenience. For example, for purposes of clarity and convenience, the above scenario may be described as the key generation module 308 passing the globally unique key to the index hashing module 312.

The message receiver module 304 includes code and routines for receiving a message. In one embodiment, the message receiver module 304 is a set of instructions executable by the processor 206. In another embodiment, the message receiver module 304 is stored in the persistent memory 205 and is accessible and executable by the processor 206. In either embodiment, the message receiver module 304 is adapted for cooperation and communication with the processor 206, other components of the NRM server 101 and other components of the non-retained messaging module 220.

The message receiver module 304 receives a message. In one embodiment, the message receiver module 304 receives a message from a sending user's messaging client 120. For simplicity and clarity, a user 125 sending a message is occasionally referred to as a "sender." For example, the message receiver module 304 is communicatively coupled to receive the message from the messaging client 120 of a sender's client device 115 via the network 105.

A messaging client 120 may include one or more of an e-mail client, instant messaging client or any other messaging client. In one embodiment, the message receiver module 304 receives a message from a messaging client 120 with little-to-no modification to the messaging client 120. For example, in one embodiment, the message receiver module 304 receives messages from an e-mail client such as Microsoft Outlook, Mozilla Thunderbird, Opera Mail, etc. Examples of little modification include entering of an outgoing email server, entering of an email account, installation of a plug-in, add-on, expansion pack, etc. It will be recognized that the preceding examples are merely examples of existing, commercially available e-mail clients and that other examples of messaging clients and e-mail clients exist.

In one embodiment, the message receiver module 304 receives a message including a recipient identifier and a message corpus. The recipient identifier is a unique identifier associated with the intended recipient of the sender's message. Examples of a recipient identifier include, but are not limited to, e-mail addresses, phone numbers, user names or any other identifier associated with a user and unique within the non-retained messaging system 100. The corpus of a message includes the content, which the sender wishes to communicate to the recipient. The message corpus may include, e.g., one or more of text, audio, video, images, files, attachments, etc.

In one embodiment, the received message has a format identical to that of a message sent using a traditional messaging system. For example, assume the messaging client 120 is an e-mail client; in one embodiment, the message receiver module 304 receives a message formatted using a standard e-mail protocol (e.g. SMTP). It will be recognized that the preceding is merely an example of a format and that others exist and may be used without departing from the teachings herein.

In one embodiment, the message receiver module 304 passes the received message to the message storing and identifier generation module 318. For example, the message receiver module 304 is communicatively coupled to the message storing and identifier generation module 318 to send the received message to the message storing and identifier generation module 318. In another embodiment, the message receiver module 304 passes the received message to the message encryption module 316. For example, the message receiver module 304 is communicatively coupled to the message encryption module 316 to send the received message to the message encryption module 316.

In some embodiments, it may be desirable to authenticate users. For example, it may be desirable to authenticate a user in order for the user to access the system 100 and/or a feature or functionality thereof. For example, it may be desirable to authenticate the user prior to one or more of composing a message, sending a message, sending a message identifier, etc. In one such embodiment, the non-retained messaging module 220 includes an optional authentication request module 306.

The authentication request module 306 includes code and routines for requesting user authentication. In one embodiment, the authentication request module 306 is a set of instructions executable by the processor 206. In another embodiment, the authentication request module 306 is stored in the persistent memory 205 and is accessible and executable by the processor 206. In either embodiment, the authentication request module 306 is adapted for cooperation and communication with the processor 206, other components of the NRM server 101 and other components of the non-retained messaging module 220.

The authentication request module 306 requests user authentication. In some embodiments, user authentication is based on credentials. In one embodiment, the authentication request module 306 requests user authentication from an authorization server 107. For example, assume that the NRM server 101 does not store credentials, because, e.g., the NRM server 101 lacks a storage device 214 and writeable persistent memory 205.

In one embodiment, the authentication request module 306 requests the user's credentials and passes the credentials, received from the user 125, to the authorization server 107 as part of the request for user authentication. In another embodiment, the authentication request module 306 passes a request for user authentication to the authorization server 107, and the authorization server 107 requests and receives the user's credentials. In either embodiment, the authorization server 107 determines whether the user is authorized based at least in part on the credentials and notifies the authentication request module 306. For example, the authorization server 107 determines whether the user is authorized based on whether a username and password provided by the user match a username and associated password stored by the authorization server 107 and notifies the authentication request module 306 whether the user is authenticated or not.

In some embodiments, one or more of the modules of the non-retained messaging module 220 execute subject to user authentication. For example, in one embodiment, the message receiver module 304 executes pending user authentication of the sending user. In another example, in one embodiment, the message storing and identifier generation module 318 executes pending user authentication of the sending user.

In one embodiment, the authentication request module 306 passes the user authentication to one or more of the other modules of the non-retained messaging module 220. For example, the authentication request module 306 is communicatively coupled to one or more of the other modules of the non-retained messaging module 220 to send the user authentication to one or more of the other modules of the non-retained messaging module 220.

The optional key generation module 308 includes code and routines for generating a globally unique key for each message. In one embodiment, the key generation module 308 is a set of instructions executable by the processor 206. In another embodiment, the key generation module 308 is stored in the persistent memory 205 and is accessible and executable by the processor 206. In either embodiment, the key generation module 308 is adapted for cooperation and communication with the processor 206, other components of the NRM server 101 and other components of the non-retained messaging module 220.

The key generation module 308 generates a globally unique key for each message. A globally unique key is a single unique object that is unique in the world across all computing devices. For example, in one embodiment, the globally unique key is a random 128 bit number, which has $2^{128}$ possibilities (approximately $3.48 \times 10^{38}$) and, therefore, extremely unlikely have conflicts or be guessed. In another example, the globally unique key is generated similar to a Globally Unique Identifier (GUID).

In one embodiment, the key generation module 308 also generates a device key. A device key is a globally unique key. In one embodiment, the device key is extremely large so that the device key is virtually impossible to be guessed or figured out. For example, in one embodiment, the device key is a random 128 bit number, which has $2^{128}$ possibilities (approximately $3.48 \times 10^{38}$) and, therefore, extremely unlikely have conflicts or be guessed. In another example, the device key is generated similar to a Globally Unique Identifier (GUID). In one embodiment, the device key is known only to the NRM server 101 associated with the device key. For example, in one embodiment, the key generation module 308 of NRM server 101a generates a device key associated with and known only by NRM server 101a, and the key generation module 308 of NRM server 101b generates a device key associated with and known only by NRM server 101b. In one embodiment, the device key is associated with a NRM server 101, but known by at least one other NRM server 101.

In one embodiment, the device key is dynamic. For example, in some embodiments, the key generation module 308 generates a new device key each time at start-up of the NRM server 101 or after detecting an (un)authorized access and expunging the non-persistent memory of all messages, keys, indexes, etc. In an alternative embodiment, the device key may be a static, unique key assigned by the manufacturer. Regardless of whether the device key is static or dynamic, in some embodiments, each copy of a message that may exist on multiple NRM servers 101 (e.g. for back-up) may have a different hashed index and encryption key for each copy of the same message on the various NRM servers 101, because each NRM server 101 is associated with a different device key.

In one embodiment, the key generation module 308 passes the globally unique key to one or more of the index hashing module 312, the encryption key generation module 314 and the message storing and identifier generation module 318. For example, the key generation module 308 is communicatively coupled to one or more of the index hashing module 312, the encryption key generation module 314 and the message storing and identifier generation module 318 to send the globally unique key to one or more of the index hashing module 312, the encryption key generation module 314 and the message storing and identifier generation module 318.

In one embodiment, the key generation module 308 passes the device key to one or more of the index hashing module 312, the encryption key generation module 314 and the message storing and identifier generation module 318. For example, the key generation module 308 is communicatively coupled to one or more of the index hashing module 312, the encryption key generation module 314 and the message storing and identifier generation module 318 to send the device key to one or more of the index hashing module 312, the encryption key generation module 314 and the message storing and identifier generation module 318.

The optional index generation module 310 includes code and routines for generating a globally unique index. In one embodiment, the index generation module 310 is a set of instructions executable by the processor 206. In another embodiment, the index generation module 310 is stored in the persistent memory 205 and is accessible and executable by the processor 206. In either embodiment, the index generation module 310 is adapted for cooperation and communication with the processor 206, other components of the NRM server 101 and other components of the non-retained messaging module 220.

The optional index generation module 310 generates a globally unique index for each message. Generating a globally unique index is optional and the non-retained message system 100 works and is secure without a globally unique index. However, in one embodiment, generating a globally unique index may increase the amount of effort necessary to locate and decrypt a message thereby adding further security to the system.

In one embodiment, the index generation module 310 passes the globally unique index to the index hashing module 312. For example, the index generation module 310 is communicatively coupled to the index hashing module 312 to send the globally unique index to the index hashing module 312.

The optional index hashing module 312 includes code and routines for generating a hashed index. In one embodiment, the index hashing module 312 is a set of instructions executable by the processor 206. In another embodiment, the index hashing module 312 is stored in the memory 208 and is accessible and executable by the processor 206. In either embodiment, the index hashing module 312 is adapted for cooperation and communication with the processor 206, other components of the NRM server 101 and other components of the non-retained messaging module 220.

The index hashing module 312 generates a hashed index. In one embodiment, the index hashing module 312 generates a hashed index based on a globally unique key. For example, in one embodiment, the index hashing module 312 generates a hashed index by hashing the globally unique key. In one embodiment, the index hashing module 312 generates a hashed index based on a globally unique key and a device key. For example, in one embodiment, the index hashing module 312 generates a hashed index by hashing the globally unique key as the salt and the device key.

In one embodiment, the index hashing module 312 generates a hashed index based on the globally unique key received from the key generation module 308 and the globally unique index received from the index generation module 310. For example, in one embodiment, the index hashing module 312 generates a hashed index by hashing the globally unique key as the salt and the globally unique index. For example, in another embodiment, the index hashing module 312 generates a hashed index by hashing the globally unique key as the salt in combination with the globally unique index and device key.

In one embodiment, the index hashing module 312 passes the hashed index to the message storing and identifier generation module 318. For example, the index hashing module 312 is communicatively coupled to the message storing and identifier generation module 318 to send the hashed index to the message storing and identifier generation module 318.

The encryption key generation module 314 includes code and routines for generating an encryption key. In one embodiment, the encryption key generation module 314 is a set of instructions executable by the processor 206. In another embodiment, the encryption key generation module 314 is stored in the persistent memory 205 and is accessible and executable by the processor 206. In either embodiment, the encryption key generation module 314 is adapted for cooperation and communication with the processor 206, other components of the NRM server 101 and other components of the non-retained messaging module 220.

The encryption key generation module 314 generates an encryption key. In some embodiments, the encryption key generation module 314 generates an encryption key for a message based on the globally unique key associated with that message. Therefore, in some embodiments, the encryption key is unique for each message.

In one embodiment, the encryption key generation module 314 generates an encryption key based on the globally unique key. For example, in one embodiment, the encryption key generation module 314 generates an encryption key using the globally unique key. In one embodiment, the encryption key generation module 314 generates an encryption key based on the globally unique key and the device key. For example, in one embodiment, the encryption key generation module 314 generates an encryption key by combining the globally unique key and the device key, or using the device key as the encryption key and the globally unique key as the initialization vector for the encryption.

In some embodiments, which include both the index hashing module 312 and the encryption key generation module 314, the encryption key generation module 314 generates an encryption key using a process different from that the index hashing module 312 uses to generate the hashed index. For example, in one embodiment, the encryption key generation module 314 generates the encryption key using the globally unique key in combination with the device key and the index hashing module 312 generates a hashed index by hashing the globally unique key as the salt combined with the globally unique index and device key.

In one embodiment, the encryption key generation module 314 passes the encryption key to the message encryption module 316. For example, the encryption key generation module 314 is communicatively coupled to the message encryption module 316 to send the encryption key to the message encryption module 316.

The optional message encryption module 316 includes code and routines for encrypting a message. In one embodiment, the message encryption module 316 is a set of instructions executable by the processor 206. In another embodiment, the message encryption module 316 is stored in the persistent memory 205 and is accessible and executable by the processor 206. In either embodiment, the message encryption module 316 is adapted for cooperation and communication with the processor 206, other components of the NRM server 101 and other components of the non-retained messaging module 220.

The message encryption module 316 optionally encrypts the message received by the message receiver module 304. In one embodiment, the encryption module 316 encrypts the message received by the message receiver module 304 using the encryption key generated by, and received from, the encryption key generation module 314. In another embodiment, encryption module 316 encrypts the message using a different encryption key.

In one embodiment, the unencrypted message is deleted from the non-persistent memory 207 responsive to encryption. For example, in one embodiment, the unencrypted message is expunged by the expunging module 324 responsive to encryption. In one embodiment, the encryption module 316 decrypts a message retrieved by the message retrieval module 322.

In one embodiment, the message encryption module 316 passes the encrypted message to the message storing and identifier generation module 318 for storage in the non-persistent memory. For example, the message encryption module 316 is communicatively coupled to the message storing and identifier generation module 318 to send the encrypted message to the message storing and identifier generation module 318.

The message storing and identifier generation module 318 includes code and routines for storing a message, generating an identifier and sending the identifier to a recipient. In one embodiment, the message storing and identifier generation module 318 is a set of instructions executable by the processor 206. In another embodiment, the message storing and identifier generation module 318 is stored in the persistent memory 205 and is accessible and executable by the processor 206. In either embodiment, the message storing and identifier generation module 318 is adapted for cooperation and communication with the processor 206, other components of the NRM server 101 and other components of the non-retained messaging module 220.

The message storing and identifier generation module 318 stores the message. In one embodiment, the message storing and identifier generation module 318 in the non-persistent memory 207 of an NRM server 101. In one embodiment, the message storing and identifier generation module 318 receives the hashed index generated by the index hashing module 312 and stores the message using the hashed index as a handle for storing and retrieving the message. Such an embodiment beneficially provides an obfuscated index for storing the message. In one embodiment, the message stored by the message storing and identifier generation module 318 is an encrypted version of the message.

The message storing and identifier generation module 318 generates a message identifier. The message identifier is a unique identifier having an enormous number of potential values so that is virtually impossible to guess or iterate a through to discover a valid identifier especially since a message is not retained indefinitely in the system 100. The message identifier is uniquely associated with a message stored in the non-persistent memory 207 of at least one NRM server 101. In one embodiment, the message identifier is a URL to the non-retained messaging system 100.

In embodiments where a globally unique key was generated by the key generation module 308 and used by the index hashing module 312 to generate a hashed index and/or by the encryption key generation module 314 to generate an encryption key, the message identifier includes the globally unique key. For example, the message storing and identifier generation module 318 generates a URL containing the globally unique key.

In embodiments where a globally unique index was generated by the index generation module 310 and used by the index hashing module 312 to generate a hashed index, the message identifier includes the globally unique index. For example, the message storing and identifier generation module 318 generates a URL containing the globally unique key and optionally a globally unique index. In one embodiment, the URL is a non-descript HTTP URL. In one embodiment, the URL is a non-descript HTTPS URL, which may beneficially provide greater security than a HTTP URL. It will be recognized that a URL is merely one example of a message identifier and other message identifiers exist.

The message storing and identifier generation module 318 sends the message identifier to the recipient. In one embodiment, the message is not sent using a third party server 190 (e.g. those of traditional message services such as e-mail, which retains copies of the message). Instead, the message storing and identifier generation module 318 sends the message identifier using a third party server. For example, the message storing and identifier generation module 318 sends the message identifier through a standard e-mail service hosted by third party server 190. In one embodiment, the message storing and identifier generation module 318 uses a gateway service, for example, an e-mail gateway service to avoid issues with spam filters and/or to balance network load.

In some embodiments, responsive to sending the identifier, information is expunged from the non-persistent memory of the NRM server(s) 101. In some embodiments, the information expunged from the NRM server(s) 101 ensures that the NRM server(s) do not have all the information to independently identify, locate and decrypt the message. Such embodiments may beneficially prevent a message from being accessed by anyone other than the recipient. Examples of information that may be expunged include one or more of the globally unique key, the globally unique index, the hashed index, the encryption key and the message identifier. For example, in one embodiment, the globally unique key, the globally unique index, the hashed index, the encryption key and the message identifier are expunged from the NRM server(s) 101. In some embodiments, the information expunged from the NRM server(s) 101 and the messaging identifier ensure that neither the NRM server(s) 101 nor the recipient of the messaging identifier have all the information to independently identify, locate and decrypt the message. For example, the identifier includes the globally unique key, but not the device key and the NRM server 101 does not have the globally unique key, but has the device key.

The information expunged after the identifier is sent depends on the embodiment and what information exists. For example, a globally unique index is not expunged when one was not generated (e.g. the non-retained messaging module 220 did not include the optional index generation module 310). In one embodiment, the information is expunged by the expunging module 324 discussed below.

In some embodiments, the identity of the sender may not be shared with the recipient. For example, the e-mail including the message identifier does not identify the sending user, but the message when retrieved and presented may or may not identify the sender depending on the embodiment. In another example, the message retrieved by the message retrieval module 322 and presented to the recipient user does not identify the sending user. In one embodiment, whether the sending user is identified to the recipient and/or at what point is determined based on a user preference of the sender and/or an administrator's setting (e.g. an administrator associated with an organization for whom the sender is an employee). In one embodiment, if the sending user is not identified, the sender identified is the NRM server 101 containing the URL for the message. In another embodiment, if the sending user is not identified, the system instead identifies an account for an organization with whom the sender is associated or an account for the public in general. In one embodiment, a message is sent without sender identifying information (i.e. not only is the sender not identified to the recipient, but there is no sender identifying information associated with the message and stored in the system 100). In some embodiments, an administrator may control whether and to what degree users are able to send messages anonymously using the system 100. For example, in one embodiment, an administrator for Corporation A may set controls such that an individual user (e.g. Bob from accounting) or group of users (e.g. the accounting department) may not send messages anonymously.

In one embodiment, the message storing and identifier generation module 318 passes the message identifier to a third party server 190. For example, the message storing and identifier generation module 318 is communicatively coupled to the third party server 190 to send the message identifier to the recipient via the third party server 190.

The optional message back-up module 320 includes code and routines for providing redundancy. In one embodiment, the message back-up module 320 is a set of instructions executable by the processor 206. In another embodiment, the message back-up module 320 is stored in the persistent memory 205 and is accessible and executable by the processor 206. In either embodiment, the message back-up module 320 is adapted for cooperation and communication with the processor 206, other components of the NRM server 101 and other components of the non-retained messaging module 220.

In some embodiments, the configuration of the NRM server 101 makes it more likely for a message to be permanently lost prior to delivery than in a traditional messaging system (e.g. e-mail). For example, in some embodiments, the NRM server 101 lacks persistent, writable storage and messages are stored by non-persistent memory; therefore, a disruption in power to the NRM server 101 (e.g. power outage or natural disaster) may expunge undelivered messages on that NRM server 101. In another example, in some embodiments, the NRM server 101 is configured to actively expunge all memory if the NRM server 101 is logged into in order to enhance security. Under such circumstances, the undelivered messages would also be permanently lost.

In one embodiment, the message back-up module 320 provides redundancy by sending back-up information to at least one additional NRM server 101. Such an embodiment beneficially increases the chances the message is deliverable even if a NRM server's memory is expunged. In one embodiment, back-up information includes the message received from the sender's messaging client 120. For example, the message receiver module 304 of NRM server 101a receives a message and the message back-up module 320 automatically forwards a copy of the received message to NRM server 101b where the message receiver module 304 of NRM server 101b receives the copy.

In some embodiments, when a globally unique key associated with a received message is generated by the key generation module 308, that globally unique key is back-up information and is sent by the back-up module 320 to at least one other NRM server 101. For example, in one embodiment, the message receiver module 304 of NRM server 101a receives a message, the key generation module 308 generates a globally unique key for that message and the message back-up module 320 automatically forwards a copy of the received message and the globally unique key to NRM server 101b.

In some embodiment, when a globally unique index associated with a received message is generated by the index generation module 310 and associated with a received message, that globally unique index is back-up information and is sent by the back-up module 320 to at least one other NRM server 101. For example, in one embodiment, the message receiver module 304 of NRM server 101a receives a message, the key generation module 308 generates a globally unique key for that message, the index generation module 310 generates a globally unique index for the message and the message back-up module 320 automatically forwards a copy of the received message, the globally unique key and the globally unique index to NRM server 101*b*.

In some embodiments, any hashed index or encryption key generated for the at least one other NRM server 101 (e.g. NRM server 101*b*) will be different from the hashed index or encryption key for the NRM server 101 that originally received the message (e.g. NRM server 101*a*) regardless of whether the same globally unique key and/or globally unique index is forwarded and used, because each NRM server 101 is associated with a different device key.

Unlike traditional messaging systems, such as e-mail, any redundant messages, also occasionally referred to herein as "back-ups," "copies" or the like are expunged from the non-retained messaging system 101 when, depending on the embodiment, the message is retrieved by the message retrieval module 322, the message is delivered for presentation to the recipient or the lifespan of the message expires.

In one embodiment, the message back-up module 320 passes back-up information to at least one other NRM server 101. For example, the message back-up module 320 is communicatively coupled to at least one other NRM server 101 to send the back-up information to at least one other NRM server 101.

The message retrieval module 322 includes code and routines for retrieving a message. In one embodiment, the message retrieval module 322 is a set of instructions executable by the processor 206. In another embodiment, the message retrieval module 322 is stored in the persistent memory 205 and is accessible and executable by the processor 206. In either embodiment, the message retrieval module 322 is adapted for cooperation and communication with the processor 206, other components of the NRM server 101 and other components of the non-retained messaging module 220.

The message retrieval module 322 retrieves a message using the identifier. In one embodiment, the message retrieval module 322 retrieves a message using the identifier responsive to the selection of the identifier. For example, assume the message identifier is a HTTPS URL which was sent to the recipient via e-mail. In one embodiment, the recipient receives the e-mail, opens the e-mail and selects the HTTPS URL, the message retrieval module 322 receives the HTTPS URL responsive to the selection and retrieves the associated message and sends that message for presentation to the user (e.g. in a messaging client 120 or web browser (not shown) window). In one embodiment, the message retrieval module 322 retrieves a message using the identifier responsive to the selection of the identifier and verification of the recipient as described below with reference to the recipient verification module 326.

Since many modules of the non-retained messaging module 220 are optional, many combinations of modules and, therefore, embodiments exist. The steps the message retrieval module 322 takes to retrieve a message vary depending on the embodiment and which, if any, optional modules (e.g. 308, 310, 312, 314, 316, 326 and 328) are included in the non-retained messaging module 200. For example, assume that the non-retained messaging module 220 includes an index hashing module 312; in one embodiment, the message retrieval module 322 retrieves a message using a globally unique key included in the message identifier to obtain the hashed index for retrieving the message from the non-persistent memory. In another example, assume that the non-retained messaging module 220 includes an encryption module 316; in one embodiment, the message retrieval module 322 retrieves an encrypted version of the message and must obtain a decrypted version prior to sending the message for presentation to the user. In yet another example, assume that the non-retained messaging module 220 includes a recipient verification module 326; in one embodiment, the message retrieval module 322 retrieves the message responsive to the recipient verification module 326 determining that the user who selected the identifier is one or more of human and the intended recipient.

In one embodiment, the message retrieval module 322 retrieves a message using the identifier in combination with a device key. For example, in one embodiment, the message retrieval module 322 passes the globally unique key (and, depending on the embodiment, globally unique index) from the URL to the index hashing module 312 which retrieves the device key associated with the NRM server 101 and generates the hashed index that was used to store the message. The message retrieval module 322 retrieves the message using the hashed index as a handle.

Depending on the embodiment, the message the message retrieval module 322 retrieves is encrypted and needs to be decrypted. In one embodiment, the message retrieval module 322 passes the globally unique key to the encryption key generation module 314 which retrieves the device key associated with the NRM server 101 and generates the encryption key used to decrypt the message. In one embodiment, the message retrieval module 322 decrypts the message itself. For example, the message retrieval module 322 receives the encryption key from the encryption key module 314 and decrypts the message. In another embodiment, the message encryption module 316 receives the encryption key and decrypts the message.

The message retrieval module 322 sends the message for presentation to the user 125 based on the identifier. For simplicity and clarity, a user 125 that is presented a message sent using and retrieved from the non-retained messaging system is occasionally referred to as a "recipient." For example, assume the message identifier is a URL; in one embodiment, the message retrieval module 322 sends the message to the location associated with the URL for presentation to the recipient. In one embodiment, when the message is presented to the recipient, the message has a similar visual format of an e-mail. For example, the message is presented via the messaging client 120 or web browser with a subject line, message body and attachments.

In one embodiment, the message retrieval module 322 passes information included in the message identifier (e.g. a globally unique key) received responsive to selection of the message identifier by the recipient user to one or more of the other modules (e.g. 312, 314, 316) of the non-retained messaging module 220 in order to retrieve the message and send the message for presentation. For example, the message retrieval module 322 is communicatively coupled to the index hashing module 312 to pass the received globally unique key to the index hashing module 312 in order to obtain the handle for retrieving the message (i.e. the hashed index).

In one embodiment, the message retrieval module 322 passes a message for presentation to a recipient user. For example, the message retrieval module 322 is communicatively coupled to the messaging client 120, or web browser, of the client device 115 of the recipient to send the message to the messaging client 120, or web browser, of the client device 115 of the recipient. In one embodiment, the message retrieval module 322 passes an indication that the message has been retrieved to the expunging module 324. For example, the message retrieval module 322 is communicatively coupled to the expunging module 324 to send the indication that the message has been retrieved to the expunging module 324.

The expunging module 324 includes code and routines for expunging messages from a NRM server 101. In one embodiment, the expunging module 324 is a set of instructions executable by the processor 206. In another embodiment, the expunging module 324 is stored in the persistent memory 205 and is accessible and executable by the processor 206. In either embodiment, the expunging module 324 is adapted for cooperation and communication with the processor 206, other components of the NRM server 101 and other components of the non-retained messaging module 220.

The expunging module 324 expunges messages from a NRM server 101. In one embodiment, the expunging module 324 expunges a message from an NRM server 101 responsive to the retrieval of the message. For example, assume the expunging module 324 receives an indication from the message retrieval module 322 that the message has been retrieved for delivery or the expunging module 324 itself detects that the message retrieval module 322 detects retrieval of the message for delivery; in one embodiment, the expunging module 324 expunges the message from the NRM server(s) 101 storing that message.

In one embodiment, the expunging module 324 expunges a message from an NRM server 101 responsive to the delivery of the message. For example, assume the expunging module 324 receives an indication from the message messaging client 120, or web browser, that the message has been received; in one embodiment, the expunging module 324 expunges the message from the NRM server(s) 101 storing that message. In one embodiment, expunging the message includes expunging sender and receiver information responsive to retrieval or delivery. In other words, in one embodiment, the non-retained messaging system 100 does not retain any sender or receiver information including logs of who sent whom a message.

In one embodiment, the expunging module 324 expunges a message from an NRM server 101 responsive to an expiration of a time period associated with the message. The expiration of a time period associated with the message is occasionally referred to herein as the "message exceeding its lifespan" or the like. In one embodiment, the time period, which is occasionally referred to herein as a message's "lifespan," is user defined. For example, assume the user specifies a time period using the messaging client 120, and the time period is stored on the client device 115 (e.g. as a user preference) and sent with each outgoing message sent using that messaging client 120; in one embodiment, the expunging module 324 receives the user defined time period and sets a timer accordingly. When the timer expires (i.e. the user defined time period has passed), the expunging module 324 expunges the message from the NRM server(s) 101 assuming the message has not already been expunged (e.g., the message was retrieved and expunged from the NRM server(s) 101 responsive to retrieval and prior to the expiration of the timer). Depending on the embodiment, the user may define a time period for each individual message or define a time period to be used for all outgoing messages unless redefined. Embodiments which provide for message expungement after a user defined time beneficially allow a user to ensure that a message is not available on the NRM server(s) 101 when the user no longer wants the message available.

In one embodiment, the time period is system defined. In one embodiment, the system defined time period includes a default used when a user defined time period has not been set. For example, does not define a message lifespan; in one embodiment, the expunging module 324 sets a default timer that is system defined. When the default timer expires, the expunging module 324 expunges the message from the NRM server(s) 101 assuming the message has not already been expunged.

In one embodiment, the system defined time period defines a maximum message lifespan. For example, in one embodiment, the expunging module 324 sets a timer that is system defined, and when the system defined timer expires, the expunging module 324 expunges the message from the NRM server(s) 101 assuming the message has not already been expunged and regardless of whether the user defined timer has expired. Embodiments which provide for message expungement after a system defined maximum time period beneficially reduce the costs of running the NRMS system 100. For example, non-persistent memory 207 is often more expensive per byte of capacity than persistent storage; therefore, a higher memory turn-over rate is desirable, because removing messages that have not been retrieved after a certain period of time so that the non-persistent memory 207 may be used by other messages may avoid the cost of adding additional NRM servers 101 and/or non-persistent memory 207 to accommodate messages which may never be retrieved. Embodiments which provide for message expungement after a system defined maximum time period may also provide additional security to the NRMS system 100 by limiting the amount of time a hacker or other nefarious entity could potentially access the message en route from the sender to the recipient.

A time period, regardless of whether the time period is user defined or system defined, may be measured from one of a plurality of events. Examples of events include, but are not limited to receipt of the message, sending of the identifier associated with the message to the recipient, retrieval of the message and delivery of the message. Embodiments in which the time period is measured from the retrieval or delivery of the message may potentially allow a recipient another opportunity to receive the message should an error occur during retrieval or delivery of the message.

In one embodiment, the expunging module 324 expunges a message from a NRM server 101 responsive to receiving a retraction request from the sender. In one embodiment, the retraction request includes the message identifier of the message the sender wishes to expunge and the expunging module 324 identifies and expunges the message associated with that identifier from the NRM server(s) 101 storing the message. In one embodiment, a sender may request to retract a message prior to a recipient's retrieval of the message and the expunging module 324 expunges that message responsive to the retraction request. For example, assume a sender sent a message by mistake and requests to retract that message; in one embodiment, the expunging module 324 receives the retraction request, identifies the relevant message, determines that the message has not been retrieved by the message retrieval module 322 and expunges the message from the NRM server(s) 101 storing the message, thereby making the message no longer available.

In one embodiment, a sender may request to retract a message even after the message is retrieved and delivered to a recipient. For example, assume a message is retrieved prior to the expiration of the message's lifespan but not immediately expunged by the expunging module 324 responsive to retrieval; in one embodiment, the expunging module 324 may receive a retraction request from the sender in the time between the message's retrieval and the expiration of the message's lifespan and expunge the message early (i.e. responsive to the retraction request and prior to the expiration of the time period defined by the lifespan).

In one embodiment, the expunging module 324 expunges other information from the NRM server 101 in addition to messages. Examples of other information include, but are not limited to one or more of the globally unique key, index and message identifier, the encryption key, un-encrypted message, the sender, the recipient. For example, in one embodiment, responsive to sending the message identifier associated with a message, the expunging module 324 expunges the globally unique key and message identifier associated with that message from the NRM server 101 ensuring the NRM server lacks the necessary information to independently identify and locate the message.

In one embodiment, the expunging module 324 expunges everything from memory responsive to detecting an unauthorized access of the NRM server 101. For example, assume the NRM server 101 detects predetermined number of failed login attempts using a system administrator's username; in one embodiment, the NRM server 101 expunges everything from memory. In one embodiment, the expunging module 324 expunges everything from memory responsive to detecting an access of the NRM server 101 regardless of whether the access is authorized or unauthorized. For example, assume the NRM server 101 detects a successful system administrator login; in one embodiment, the NRM server 101 expunges everything from memory responsive to detecting the login.

The expungement impedes access to the expunged data. The expungement the expunging module 324 performs may vary depending on the embodiment. Examples of expungement include, but are not limited to, removing handles (e.g. pointers) to the expunged data, overwriting the expunged data with new data (e.g. a new message or writing to zero) or any other method of wiping data from memory, which allows the memory to be reused.

The optional recipient verification module 326 includes code and routines for verifying a recipient user prior to retrieving and presenting the message to the recipient user. In one embodiment, the recipient verification module 326 is a set of instructions executable by the processor 206. In another embodiment, the recipient verification module 326 is stored in the persistent memory 205 and is accessible and executable by the processor 206. In either embodiment, the recipient verification module 326 is adapted for cooperation and communication with the processor 206, other components of the NRM server 101 and other components of the non-retained messaging module 220.

The recipient verification module 326 verifies a recipient user prior to retrieving and presenting the message to the recipient user. In one embodiment, the recipient verification verifies that the recipient user (i.e. the user that selected the message identifier) is one or more of human and the intended recipient. Such recipient verification may beneficially provide further security to the non-retained messaging system 100 by further reducing the possibility of unauthorized access to a message sent via the non-retained messaging system 100.

In one embodiment, the recipient verification module 326 verifies that a recipient is human. In one embodiment, the recipient verification module 326 verifies that the recipient is human (rather than, for example, a bot, crawler, computer or other automated, non-human reader) using a Completely Automated Public Turing test to tell Computers and Humans Apart (CAPTCHA). In some embodiments, the CAPTCHA may be auditory, visual or a combination. For example, in one embodiment, the recipient verification module 326 presents a visual CAPTCHA in the form of an on-screen, human-only readable challenge to the recipient responsive to selection of a message identifier. In another example, the recipient verification module 326 presents an auditory CAPTCHA in the form of a human-only intelligible audio challenge to the recipient responsive to selection of a message identifier. The recipient verification module 326 receives a recipient's response to the presented CAPTCHA challenge, and determines whether the response matches the challenge. In one embodiment, the message retrieval module 322 retrieves the message based at least in part on whether the recipient verification module 326 determines that the response matches the challenge. In one embodiment, the message retrieval module 322 does not retrieve the message when the recipient verification module 326 determines that the response does not match the challenge.

In one embodiment, the recipient verification module 326 determines whether to verify that a recipient is human based on a sender's preference. For example, a sender may set a preference to verify the humanity the recipient for all messages or for messages to a particular recipient or group of recipients, and the recipient verification module 326, responsive to selection of the message identifier, determines whether the message is flagged for recipient verification based on the sender's preference and presents (or does not present) a challenge accordingly. In one embodiment, the recipient verification module 326 determines whether to verify that a recipient is human automatically and without user intervention. For example, recipient verification module 326 determines to challenge the recipient, when the selection of the identifier is received from an unfamiliar location (e.g. an IP address or device not previously used by or associated with the recipient).

In one embodiment, the recipient verification module 326 verifies that a recipient is the intended recipient. In one embodiment, the recipient verification module 326 verifies that the recipient is the intended recipient using verification information. Verification may be something the user is (e.g. a biometric), something the user has (e.g. an electronic key) or something the user knows (e.g. a PIN or password). For clarity and convenience, the description below primarily focuses on a password (e.g. a numeric or alpha-numeric string), but it should be recognized that description herein extends to other verification information.

In one embodiment, the recipient verification module 326 receives a selection of the message identifier, determines whether to verify the user's identity. Responsive to determining to verify the user's identity, the recipient verification module 326 requests and receives verification information (e.g. a password) from the recipient and determines whether the received information (e.g. entered password) matches stored verification information (e.g. password associated with the message or recipient). In one embodiment, the message retrieval module 322 retrieves the message based at least in part on whether the recipient verification module 326 determines that the received verification information matches the stored verification information. In one embodiment, the message retrieval module 322 does not retrieve the message when the recipient verification module 326 determines that the received verification information does not match stored verification information.

In one embodiment, verification information is message-specific, i.e., specific to an individual message or group of messages. For example, a different password may be associated with each individual message upon message creation (e.g. when the message receiver module 304 receives the message). In one embodiment, verification information is recipient-specific, i.e., specific to an individual recipient or group of recipients. For example, a recipient (e.g. User 125b) is associated with a first password, which the recipient (i.e. User 125b) provides in order access a message from a sender (e.g. User 125*a*), and a second password, which the recipient (i.e. User 125*b*) provides in order access a message from another sender (e.g. User 125*n*). Depending on the embodiment, the verification information may be stored differently. For example, in one embodiment, message-specific verification information may be associated with that specific message and stored in association with the message in the non-persistent memory 207, and recipient-specific verification information, in one embodiment, is stored in the data store 130 similar to a sender's credentials.

Depending on the embodiment, verification information may be auto-generated or sender defined. For example, in some embodiments, the recipient verification module 326 receives a password from the sender and associates the received password with a message, recipient or group of recipients depending on the embodiment. In another example, in some embodiments, the recipient verification module 326 automatically generates (e.g. randomly) a password and associates the generated password with a message, recipient or group of recipients depending on the embodiment.

In one embodiment, the recipient verification module 326 sends verification information to the recipient using a traditional messaging service (e.g. e-mail, instant message, social network post, micro-blog post, SMS message, etc.). In one embodiment, the recipient verification module 326 sends the verification information to the recipient using the same traditional messaging service that is used to send the message identifier. For example, assume the message identifier was sent to the recipient via e-mail; in one embodiment, the recipient verification module 326 sends a randomly generated password for that message in a separate e-mail.

In one embodiment, the recipient verification module 326 sends the verification information to the recipient using a different traditional messaging service than is used to send the message identifier. For example, assume the message identifier was sent to the recipient via e-mail; in one embodiment, the recipient verification module 326 sends a randomly generated password for that message in an SMS text message. Such out-of-band communication of the verification may beneficially provide additional security as the number of accounts or devices an unauthorized or unintended recipient would need to have access to in order to retrieve the message is greater.

In some embodiments, the recipient verification module 326 may provide a hint associated with the verification information. For example, assume the verification information is a sender-defined, message-specific password, in one embodiment, the recipient verification module 326 prompts the user for a hint (e.g. provides a text field in which the sender may type a hint or security question), which is provided to the recipient so that the recipient may determine and provide the proper verification information and successfully access the message. In another example, assume the verification information is a recipient-specific password, in one embodiment, the recipient verification module 326 provides a hint (e.g. provides a security question such as "What was the name of your first pet?") so that the intended recipient may determine and provide the proper verification information and successfully access the message.

In one embodiment, the recipient verification module 326 provides a hint that is sent with the message identifier. For example, a recipient receives an e-mail with both a URL (i.e. message identifier) and "What's was Tom's nickname freshman year?" (i.e. a hint). In another example, a social network post on the sender's profile may include both a URL (i.e. message identifier) and "My favorite color" (i.e. a hint). Embodiments in which a hint is provided with the message identifier may beneficially add recipient verification to a message without needing to separately communicate the verification information. For example, providing password hints with the message identifier allows such embodiments to utilize verification without using an out-of-band message (e.g. in-person or different electronic communication system) or out-of-message (e.g. by sending a second, separate e-mail).

It should be noted that, while the embodiment discussed herein has two modules—the recipient verification module 326 which is discussed primarily with regard to recipient verification and the authentication module 240 is discussed primarily with regard to authenticating a sender, in some embodiments, a single module may be used to authenticate/verify both senders and recipients.

In one embodiment, the recipient verification module 326 passes the selected message identifier or an approval to retrieve the associated message to the message retrieval module 322. For example, the recipient verification module 326 is communicatively coupled to the message retrieval module 322 to send the selected message identifier or approval to retrieve the associated message to the message retrieval module 322. In one embodiment, the recipient verification module 326 passes the message identifier or approval to retrieve the associated message to the message retrieval module 322. For example, the recipient verification module 326 is communicatively coupled to the message retrieval module 322 to send the message identifier or approval to retrieve the associated message to the message retrieval module 322.

The record and notification module 328 includes code and routines for one or more of generating records of events and notifying users of events associated with the non-retained messaging system 100. In one embodiment, the record and notification module 328 is a set of instructions executable by the processor 206. In another embodiment, the record and notification module 328 is stored in the persistent memory 205 and is accessible and executable by the processor 206. In either embodiment, the record and notification module 328 is adapted for cooperation and communication with the processor 206, other components of the NRM server 101 and other components of the non-retained messaging module 220.

In one embodiment, the record and notification module 328 generates records of one or more events associated with the non-retained messaging system 100. Examples of events include, but are not limited to, the non-retained messaging system's receipt of a message to be sent using the non-retained messaging system 100, selection of the message identifier by a recipient (i.e. request for retrieval of the message), successful delivery of the message to a recipient (i.e. complete message retrieved and delivered to recipient's device), access of an attachment associated with the message, etc.

In one embodiment, the record and notification module 328 generates a record of the non-retained messaging system's receipt of a message to be sent using the non-retained messaging system 100. For example, the record and notification module 328 generates a record when the message receiver module 304 receives a message. In one embodiment, the record and notification module 328 generates a record in the form of a log entry. For example, the record and notification module 328 generates a log entry including one or more of the sender, the recipient, the location of the sender and the time of receipt of the message to be sent. In one embodiment, the record and notification module 328 generates a record in the form of a traditional message. For example, the record and notification module 328 generates and sends an e-mail copy of the message to an e-mail address associated with the sender (e.g. the user's personal or corporate e-mail), so that the sender's e-mail inbox has a record of the messages sent by that user via the non-retained messaging system 100. In another example, the record and notification module 328 generates and sends an e-mail message describing the message sent using the non-retained message system 100 (e.g. an e-mail describes the sender, recipient, content, etc., but does not actually include the content of the message sent using system 100).

In one embodiment, the record and notification module 328 generates a record of selection of the message identifier by a recipient (i.e. request for retrieval of the message). For example, in one embodiment, the record and notification module 328 generates a record including the recipient, time and location of the selection. In one embodiment, a user may request such a record (e.g. by selecting the message identifier or otherwise providing the message identifier) and receive the record for that message from the record and notification module 328. Such an embodiment, may beneficially allow the user to verify whether the recipient requested the message.

In one embodiment, the record and notification module 328 generates a record of successful delivery of the message to a recipient (i.e. complete message retrieved and delivered to recipient's device). For example, in one embodiment, the record and notification module 328 generates a record including the recipient, time and recipient location upon successful delivery of the message. In one embodiment, a user may request such a record (e.g. by selecting the message identifier or otherwise providing the message identifier) and receive the record for that message from the record and notification module 328. Such an embodiment, may beneficially allow the user to verify whether the recipient successfully received the message.

In one embodiment, the record and notification module 328 generates a record for viewing of an attachment associated with the message. For example, in one embodiment, the record and notification module 328 receives an attachment identifier responsive to a recipient opening (or otherwise viewing) an attachment and generates a record including the recipient, attachment identifier, time attachment was requested for viewing (i.e. opened) and the recipient's location. In one embodiment, a user may request such a record (e.g. by selecting the message identifier or otherwise providing the message identifier) and receive the record for that message from the record and notification module 328. Such an embodiment, may beneficially allow the user to verify whether the recipient viewed an attachment.

In one embodiment, sender controls whether the record and notification module 328 generates a record for an event. For example, in one embodiment, the sender may select preferences such that an e-mail copy of messages sent using the non-retained messaging system are sent to the user's personal e-mail account. In another embodiment, an administrator controls whether the record and notification module 328 generates a record for an event. For example, a company's administrator may control whether a copy of messages sent using the non-retained messaging system 100 are sent to that employee's corporate e-mail or other corporate e-mail account for archiving/record keeping/auditing. In some embodiments, the administrator's settings supersede a sender's. For example, in one embodiment, an administrator may set controls such that an e-mail copy of a message sent using the non-retained messaging system 100 is sent to a corporate e-mail account (e.g. associated with the sender's group of users) and the sender may not override that setting or otherwise prevent the e-mail copy from being sent.

In one embodiment, the record and notification module 328 notifies a user of one or more events associated with the non-retained messaging system 100. For example, the record and notification module 328 sends an e-mail or other traditional message (e.g. a SMS text message) to a message's sender responsive to the message retrieval module 322 receiving a selection of the message identifier for that message. In one embodiment, the sender may control whether an event triggers a notification and which traditional message system is used to send the notification for that type of event. In one embodiment, an administrator may control whether an event triggers a notification and which traditional message system is used to send the notification for that type of event.

As previously mentioned, although many of the examples herein primarily reference e-mail (e.g. discuss an e-mail client, sending an identifier via e-mail, etc.), it should be recognized that the disclosure herein applies to other messaging systems. For example, in one embodiment, a sender (e.g. User A 125a) using a messaging client 120 may draft a social network post (e.g. a Facebook post) and the message storing and identifier generation module 318 posts the message identifier (e.g. a URL) associated with that social network post under the sender's social network account (e.g. on User A's "wall"). In some embodiments, the posted message identifier may be accompanied by a text description or the text description may serve as a hypertext link. When a user (who may be the sender or another user such as a sender's friend) visits the sender's social networking site, the user is presented the post with the message identifier (i.e. URL) and may select the message identifier (i.e., the user is a recipient) and the message retrieval module 322 retrieves the social network post. Therefore, the social networking message (i.e. the content) is no longer accessible after it is expunged from the non-retained message system 100 and, even if the social network retains the posted message identifier indefinitely, the content is no longer stored or accessible indefinitely. In some embodiments, the recipient verification module 326 cooperates with the social network's privacy settings (e.g. provides verification information to a set of users with permission from the social networking system to view the sender's social network posts) or supplements the privacy settings (e.g. recipient that is proven to be human, with permission from social network to view sender's social network wall and received a message-specific password for the post may be presented the post).

In one embodiment, different instances of the non-retained messaging module 220 exist and each instance performs non-retained messaging for a different type of messaging service (e.g. non-retained messaging module 220 for e-mail, non-retained messaging module 220 for social networks, etc.). In another embodiment, different instances of the non-retained messaging module 220 exist and each may accommodate a different provider within a type of messaging service, e.g., within social networking there may be separate non-retained messaging modules 220 customized for each of Google+, LinkedIn, Twitter, Facebook, etc. In yet another embodiment, a single instance of the non-retained messaging module 220 exists and each may accommodate heterogeneous messaging services, e.g., when it receives the message the non-retained messaging module 220 may determine (e.g. based on the messaging client 120) whether to send the message identifier as an e-mail or as a social network post and, if the latter, in which social network to post the message identifier.

Example Processes

FIGS. 4, 5 and 6A-B depict various methods 400, 500, 600 performed by the system described above in reference to FIGS. 1-3.

Figure 4:
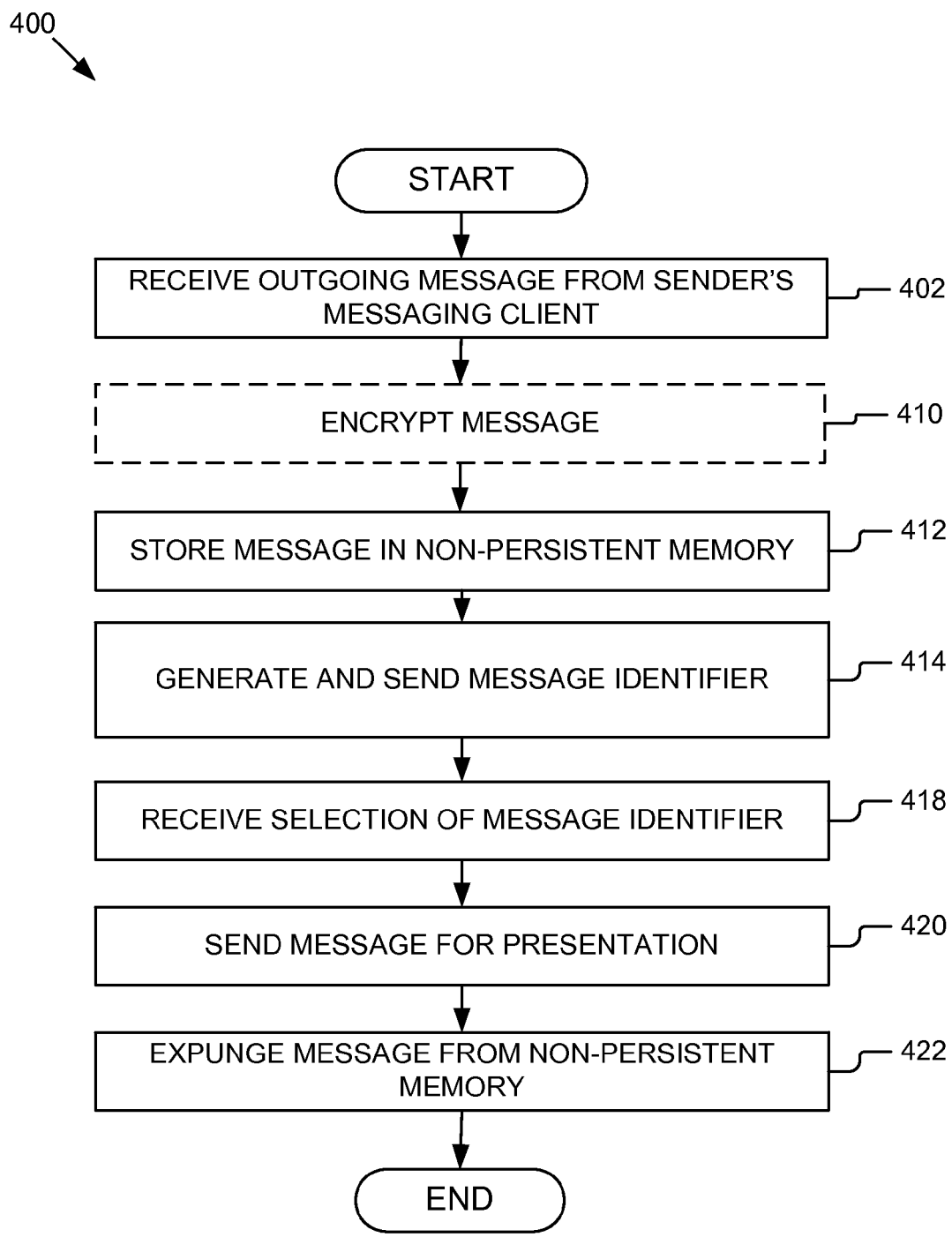
FIG. 4 is a flow chart illustrating a method for non-retained electronic messaging according to one embodiment.

FIG. 4 is a flow chart illustrating a method 400 for non-retained electronic messaging according to one embodiment. At block 402, the message receiver module 304 of the non-retained messaging module 220 receives a message from a sender's messaging client 120. At block 410, the message encryption module 316 optionally encrypts the message received at block 402. At block 412, the message storing and identifier generation module 318 stores the message in non-persistent memory 207. At block 414, the message storing and identifier generation module 318 generates and sends a message identifier associated with the message stored at step 412. At block 418, the message retrieval module 322 receives selection of the message identifier. Responsive to receiving the selection of the message identifier at block 418, the message retrieval module 322, at block 420, retrieves the message, decrypts the message if encrypted at block 410, and sends the message for presentation. At block 422, the expunging module 324 expunges the message from the non-persistent memory 207.

Figure 5:
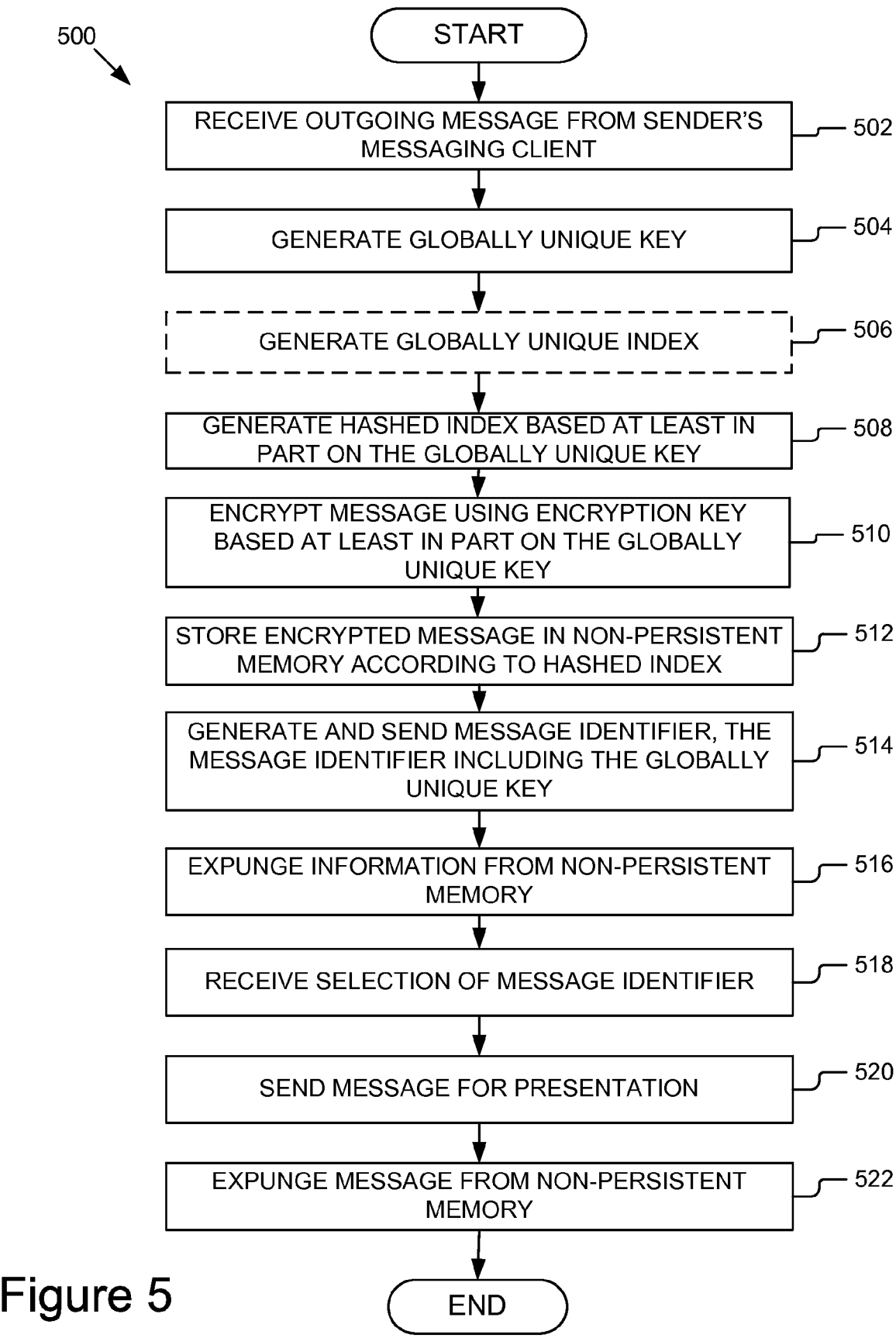
FIG. 5 is a flow chart illustrating a method for non-retained electronic messaging according to another embodiment.

FIG. 5 is a flow chart illustrating a method 500 for non-retained electronic messaging according to another embodiment. At block 502, the message receiver module 304 of the non-retained messaging module 220 receives a message from a sender's messaging client 120. At block 504, the key generation module 308 generates a globally unique key. At block 506, the index generation module 310 optionally generates a globally unique index. At block 508, the index hashing module 312 generates a hashed index based at least in part on the globally unique key generated at block 504 and the globally unique index if generated at block 506. At block 510, the message encryption module 316 encrypts the message using an encryption key based at least in part on the globally unique key generated at block 504. At block 512, the message storing and identifier generation module 318 stores the encrypted message in non-persistent memory according to the hashed index generated at block 508. At block 514, the message storing and identifier generation module 318 generates and sends a message identifier which includes the globally unique key generated at block 504. When a globally unique index is generated at block 506 and used to generate the hashed index at block 508, the message identifier generated at block 514 also includes that globally unique index. At block 516, information (e.g., the globally unique key generated at block 504, the globally unique index optionally generated at block 506, the hashed index generated at block 508 and the message identifier generated at block 514) is expunged from the non-persistent memory 207 by the expunging module 324. At block 518, the message retrieval module 322 receives selection of the message identifier sent at block 514. Responsive to receiving the selection of the message identifier, at block 518, the message retrieval module 322 retrieves, at block 520, the message and sends the message for presentation. At block 522, the expunging module 324 expunges the message from the non-persistent memory 207.

Figure 6A:
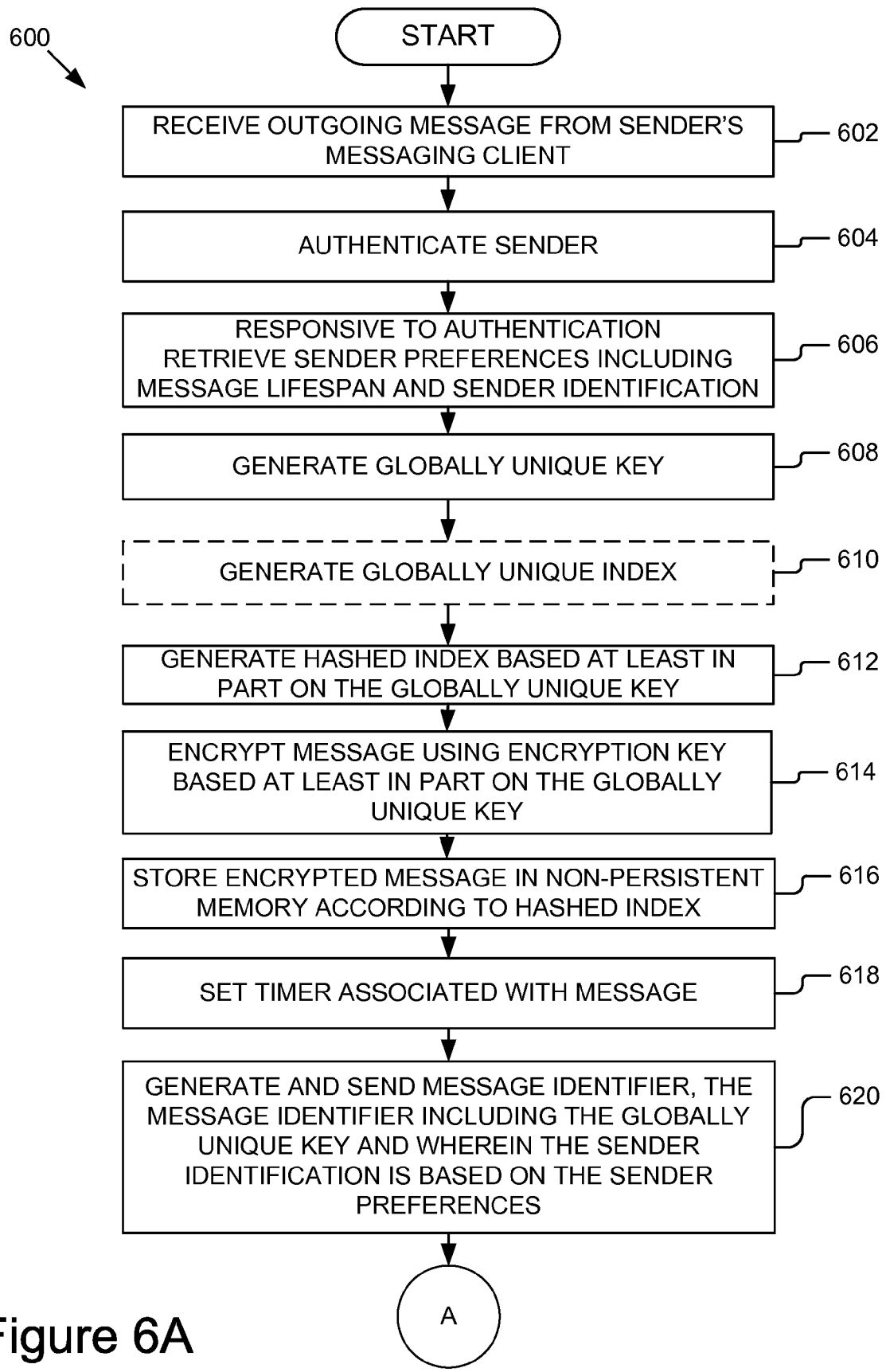
FIG. 6A-6B is a flow chart illustrating a method for non-retained electronic messaging according to yet another embodiment.
Figure 6B:
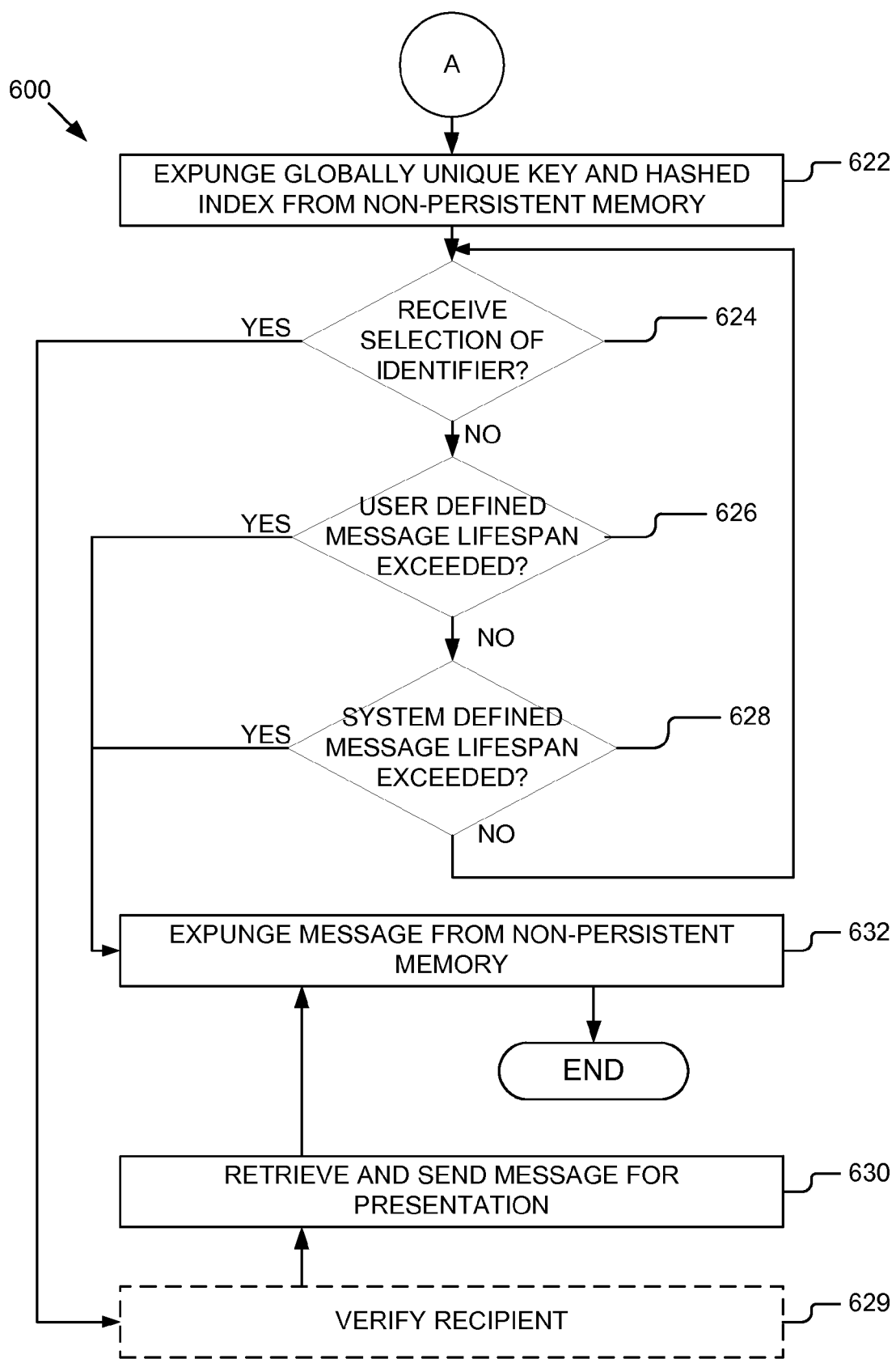

FIGS. 6A and 6B are flow charts illustrating a method 600 for non-retained electronic messaging according to yet another embodiment.

At block 602, the message receiver module 304 of the non-retained messaging module 220 receives a message from a sender's messaging client 120. At block 604, the authentication request module 306 requests and receives authentication of the sender from an authorization server 107. At block 606, responsive to authentication at block 604, the non-retained messaging module 220 retrieves sender preferences including a message lifespan preference and sender identification preference. At block 608, the key generation module 308 generates a globally unique key. At block 610, the index generation module 310 optionally generates a globally unique index. At block 612, the index hashing module 312 generates a hashed index based at least in part on the globally unique key generated at block 608 and the globally unique index if generated at block 610. At block 614, the message encryption module 316 encrypts the message using an encryption key based at least in part on the globally unique key generated at block 608. At block 616, the message storing and identifier generation module 318 stores the encrypted message in non-persistent memory according to the hashed index. At block 618, the expunging module 324 sets a timer associated with the message. At block 620, the message storing and identifier generation module 318 generates and sends a message identifier which includes the globally unique key generated at block 608. When a globally unique index is generated at block 610 and used to generate the hashed index at block 612, the message identifier generated at block 620 also includes that globally unique index.

Referring now to FIG. 6B, at block 622, information (e.g., the globally unique key generated at block 608, the globally unique index optionally generated at block 610, the hashed index generated at block 612, the encryption key used at block 614 and the message identifier generated at block 620) is expunged from the non-persistent memory 207 by the expunging module 324.

At block 624, the message retrieval module 322 determines whether a selection of the message identifier has been received. If the message retrieval module 322 determines that a selection of the message identifier has been received (624—Yes), the method 600 continues at block 629 or block 630 depending on the embodiment. When recipient verification is not performed, for the message associated with the selected identifier or generally, block 629 is skipped or omitted and the method 600 continues at block 630. When recipient verification is performed, for the message associated with the selected identifier or generally, the method 600 continues at block 629. At block 629, the recipient verification module 326 verifies the recipient and responsive to successful verification of the recipient the method 600 continues at block 630. At block 630, the message retrieval module 322 retrieves the message and sends the message for presentation to the user. The expunging module 324 expunges, at block 632, the message from the non-persistent memory 207, and the method 600 ends.

If the message retrieval module 322 determines that a selection of the message identifier has not been received (624—No), the method 600 continues at block 626. At block 626, the expunging module 324 determines whether the user defined message lifespan has been met or exceeded. If the expunging module 324 determines that the user defined message lifespan has been met or exceeded (626—Yes), the method 600 continues at block 632. If the expunging module 324 determines that the user defined message lifespan has not been met or exceeded (626—No), the method 600 continues at block 628.

At block 628, the expunging module 324 determines whether the system defined message lifespan has been met or exceeded. If the expunging module 324 determines that the system defined message lifespan has been met or exceeded (628—Yes), the method 600 continues at block 632. If the expunging module 324 determines that the system defined message lifespan has not been met or exceeded (628—No), the method 600 continues at block 624. At block 632, the expunging module 324 expunges the message from the non-persistent memory 207, and the method 600 ends.

Figure 7:
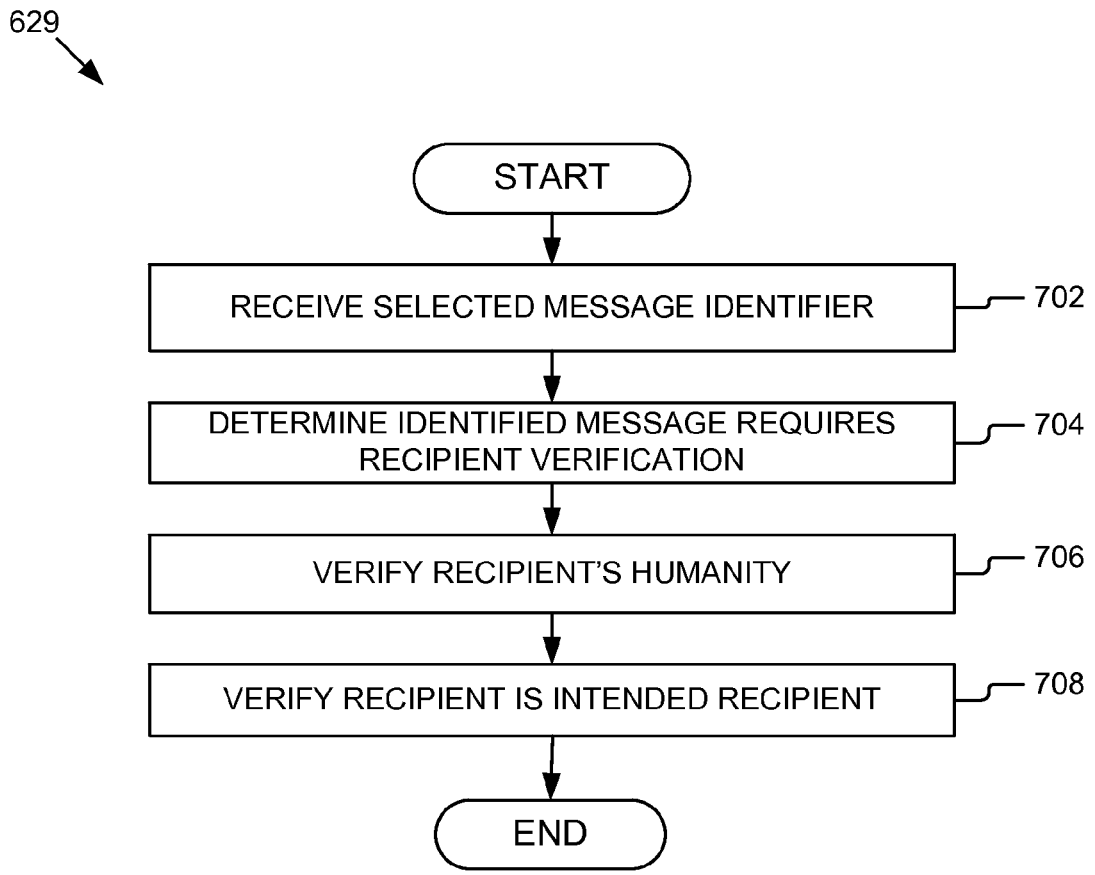
FIG. 7 is a flow chart illustrating a method for verifying a recipient according to one embodiment.

FIG. 7 is a flow chart illustrating a method 629 for verifying a recipient according to one embodiment. At block 702, the recipient verification module 326 of the non-retained messaging module 220 receives a selected message identifier. At block 704, the recipient verification module 326 determines that the message associated with the selected message identifier received at block 702 requires recipient verification. At block 706, the recipient verification module 326 verifies the humanity of the recipient. At block 708, the recipient verification module 326 verifies the identity of the recipient as the intended recipient (e.g. using verification information). It should be noted that method 629 verifies both the humanity and identity of the recipient as the intended receiver; however, other embodiments that verify only humanity or only that the recipient is the intended recipient exist.

Figure 8:
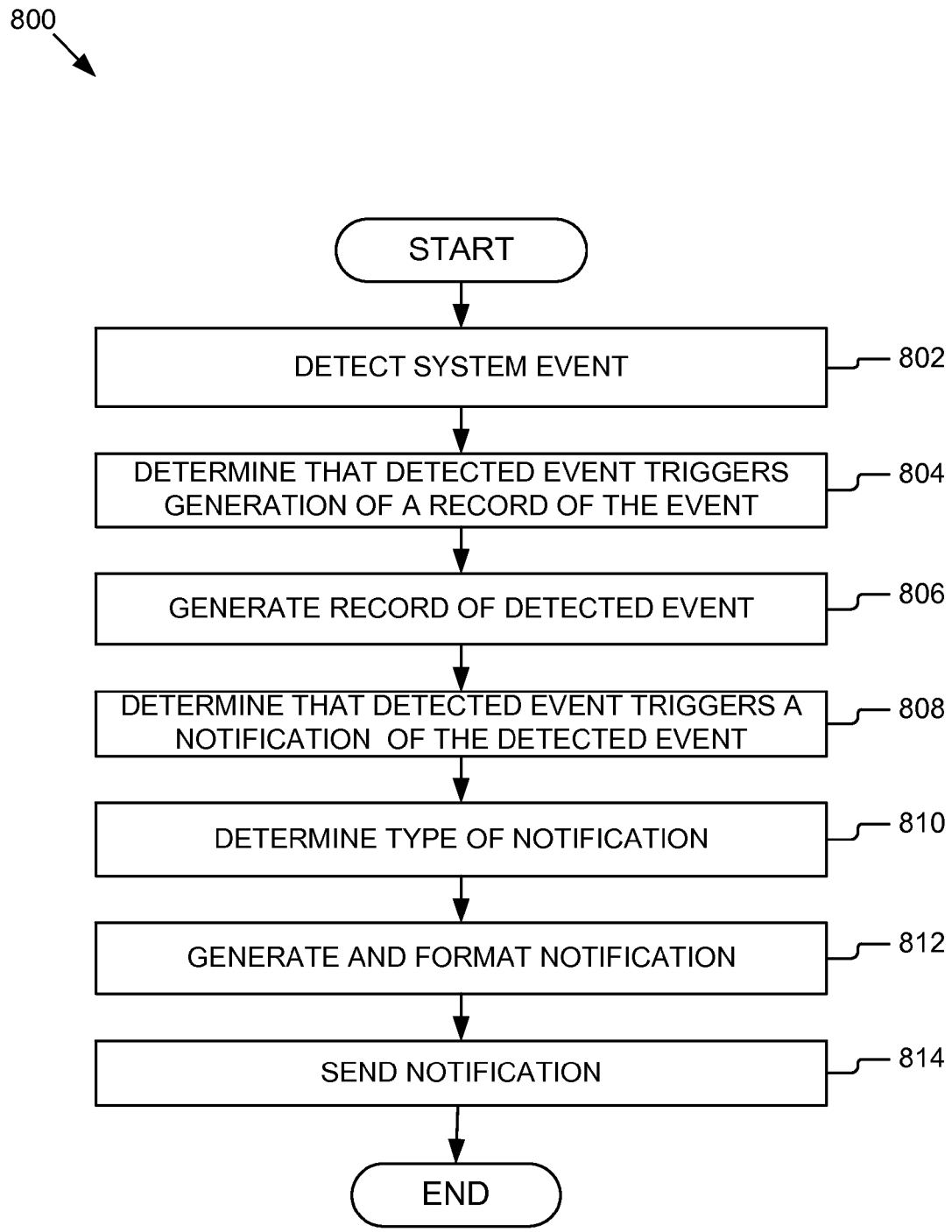
FIG. 8 is a flow chart illustrating a method for generating a record and notification of an event according to one embodiment.

FIG. 8 is a flow chart illustrating a method 800 for generating a record and notification of an event according to one embodiment. At block 802, the record and notification module 328 of the non-retained messaging module 220 detects an event in the non-retained messaging system 100. At block 804, the record and notification module 328 determines that the detected event triggers generation of a record of that detected event. At block 806, the record and notification module 328 generates a record of the detected event. At block 808, the record and notification module 328 determines that the detected event triggers a notification of the detected event. At block 810, the record and notification module 328 determines a type of notification (e.g. e-mail, SMS, etc.). At block 812, the record and notification module 328 generates and formats the notification. At block 814, the record and notification module 328 sends the notification. It should be noted that while method 800 describes an event that triggers both a record and a notification, in some embodiments, some events may trigger either a generation of a record or a notification to the user, but not both. It should also be noted that while method 800 describes an event that triggers both a record and a notification, in some embodiments, the record and notification module 328 may not provide one of the recordation functionality and the notification functionality.

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A method comprising:
   receiving, using one or more computing devices, a message;
   generating, using the one or more computing devices, a globally unique key;
   generating, using the one or more computing devices, a hashed index based at least in part on the globally unique key;
   storing, using the one or more computing devices, the message in a non-transitory, non-persistent memory of the one or more computing devices using the hashed index;
   setting, using the one or more computing devices, a timer used to determine whether a lifespan associated with the message has been exceeded and is to be expunged from the one or more computing devices;
   generating, using the one or more computing devices, a message identifier, the message identifier based at least in part on the globally unique key;
   sending, using the one or more computing devices, the message identifier to a recipient device;
   expunging, using the one or more computing devices, the globally unique key, the hashed index and the message identifier from the one or more computing devices responsive to sending the message identifier to the recipient device;
   receiving, using the one or more computing devices, a selection of the message identifier from the recipient device and the globally unique key;
   retrieving, using the one or more computing devices, the message from the non-transitory, non-persistent memory;
   sending the message to the recipient device for presentation; and
   expunging, using the one or more computing devices, the message from the one or more computing devices subsequent to sending the message to the recipient device for presentation.

2. The method of claim 1 further comprising:
   receiving, using the one or more computing devices, a response to a challenge;
   verifying, using the one or more computing devices, that a user of the recipient device is human based on the response to the challenge; and
   wherein the message is retrieved from the non-transitory, non-persistent memory based on the user being verified as human.

3. The method of claim 1 further comprising:
   receiving, using the one or more computing devices, verification information from the recipient device;
   verifying, using the one or more computing devices, that a user of the recipient device is an intended recipient; and
   wherein the message is retrieved from the non-transitory, non-persistent memory based on the user being verified as an intended recipient.

4. The method of claim 3 further comprising:
   sending a hint for correct verification information with the message identifier.

5. The method of claim 3 further comprising:
   sending the message identifier and verification information separately.

6. The method of claim 1 wherein one or more of the message identifier and the message are sent anonymously.

7. The method of claim 1 wherein the message identifier is sent to a recipient device as one or more of an e-mail to a recipient user, a text message to a recipient user's phone number and a post associated with a sending user's social network site.

8. The method of claim 1 further comprising:
detecting, using the one or more computing devices, an event;
determining, using the one or more computing devices, whether the detected event triggers one or more of a generation of a record of the event and a notification of the event to a user; and
generating, using the one or more computing devices, one or more of the record of the event and the notification of the event based on the determination.

9. The method of claim 1 further comprising:
receiving, using the one or more computing devices, a retraction request including the message identifier of the message to be retracted;
identifying, using the one or more computing devices, the message in a non-transitory, non-persistent memory of the one or more computing devices based on the message identifier; and
expunging, using the one or more computing devices, the message from the one or more devices responsive to receiving the retraction request, wherein the message is no longer available for retrieval and sending to the recipient device responsive to receiving the retraction request.

10. A non-transitory storage medium including instructions that when executed by a computing device cause the computing device to:
receive a message;
generate a globally unique key;
generate a hashed index based at least in part on the globally unique key;
store the message in a non-transitory, non-persistent memory of the computing device using the hashed index;
set a timer used to determine whether a lifespan associated with the message has been exceeded and is to be expunged from the one or more computing devices;
generate a message identifier, the message identifier based at least in part on the globally unique key;
send the message identifier to a recipient device;
expunge the globally unique key, the hashed index and the message identifier from the one or more computing devices responsive to sending the message identifier to the recipient device;
receive a selection of the message identifier from the recipient device and the globally unique key;
retrieve the message from the non-transitory, non-persistent memory;
send the message to the recipient device for presentation; and
expunge the message from the one or more devices responsive to sending the message to the recipient device for presentation.

11. A system comprising:
a hardware processor; and
a memory, the memory storing instructions that, when executed by the hardware processor, cause the system to:
receive a message;
generate a globally unique key;
generate a hashed index based at least in part on the globally unique key;
store the message in a non-transitory, non-persistent memory using the hashed index;
set a timer used to determine whether a lifespan associated with the message has been exceeded and is to be expunged from the non-transitory, non-persistent memory;
generate a message identifier, the message identifier based at least in part on the globally unique key;
send the message identifier to a recipient device;
expunge the globally unique key, the hashed index and the message identifier responsive to sending the message identifier to the recipient device;
receive a selection of the message identifier from the recipient device and the globally unique key;
retrieve the message from the non-transitory, non-persistent memory;
send the message to the recipient device for presentation; and
expunge the message from the non-transitory, non-persistent memory subsequent to sending the message to the recipient device for presentation.

12. The system of claim 11, further comprising instructions that cause the system to:
receive a response to a challenge and verifying that a user of the recipient device is human based on the response to the challenge; and
wherein the message is retrieved from the non-transitory, non-persistent memory based on the user being verified as human.

13. The system of claim 11, further comprising instructions that cause the system to:
receive verification information from the recipient device and verifying that a user of the recipient device is an intended recipient; and
wherein the message is retrieved from the non-transitory, non-persistent memory based on the user being verified as an intended recipient.

14. The system of claim 11, wherein the message identifier and hint for correct verification information are sent together.

15. The system of claim 11, wherein the message identifier and verification information are sent separately.

16. The system of claim 11 wherein one or more of the message identifier and the message are sent anonymously.

17. The system of claim 11 wherein the message identifier is sent to a recipient device as one or more of an e-mail to a recipient user's e-mail, a text message to a recipient user's phone number and a post to a sending user's social network site.

18. The system of claim 11, further comprising instructions that cause the system to:
detect an event, determine whether the detected event triggers one or more of a generation of a record of the event and a notification of the event to a user, and generate one or more of the record of the event and the notification of the event based on the determination.

* * * * *